(12) United States Patent
Hirano et al.

(10) Patent No.: US 6,577,684 B1
(45) Date of Patent: Jun. 10, 2003

(54) TRANSMISSION/RECEPTION METHOD AND DEVICE WHERE INFORMATION IS ENCODED AND DECODED ACCORDING TO RULES DEFINED BASED ON A RELATION BETWEEN A PREVIOUSLY-GENERATED MULTILEVEL CODE AND A CURRENTLY GENERATED MULTILEVEL

(75) Inventors: Jun Hirano, Kadoma (JP); Susumu Morikura, Yawata (JP); Satoshi Furusawa, Osaka (JP)

(73) Assignee: Matsushita Electric Industrial Co., Ltd., Osaka-Fu (JP)

( * ) Notice: Subject to any disclaimer, the term of this patent is extended or adjusted under 35 U.S.C. 154(b) by 0 days.

(21) Appl. No.: 09/287,179

(22) Filed: Apr. 6, 1999

(30) Foreign Application Priority Data

Apr. 7, 1998 (JP) .......................... 10-094306

(51) Int. Cl.[7] .............................. H04L 25/34
(52) U.S. Cl. ........................ 375/286; 375/264
(58) Field of Search ................... 375/130, 244, 375/246, 253, 264, 265, 286, 288; 341/50, 51, 56, 57, 58; 370/498, 522

(56) References Cited

U.S. PATENT DOCUMENTS

| 3,925,611 | A | * | 12/1975 | Dennis .................... 380/31 |
|---|---|---|---|---|
| 3,947,767 | A | * | 3/1976 | Koike et al. ................ 375/290 |
| 4,530,088 | A | | 7/1985 | Hamstra et al. ............ 370/522 |
| 5,050,189 | A | | 9/1991 | Cox et al. .................... 375/223 |
| 5,412,687 | A | * | 5/1995 | Sutton et al. ................ 375/133 |
| 5,587,797 | A | * | 12/1996 | Dirr ....................... 358/426.13 |

FOREIGN PATENT DOCUMENTS

| EP | 0 490 504 A2 | 6/1992 |
|---|---|---|
| WO | 97/50182 | 12/1997 |

* cited by examiner

Primary Examiner—Stephen Chin
Assistant Examiner—Chieh M. Fan
(74) Attorney, Agent, or Firm—Wenderoth, Lind & Ponack, L.L.P.

(57) ABSTRACT

At a transmitting end, a selector multiplexes a command and data inputted from different systems to generate a multiplexed signal string(s). An encoding portion determines an amplitude value of a current multilevel code according to predetermined encoding rules based on a detected symbol and the amplitude value of a multilevel code generated immediately before and generates a multilevel code string. A transmitting portion transmits the generated multilevel code string to a receiving end through a transmission path. A decoding portion of the receiving end decodes and reproduces the command and the data with an amplitude value of the multilevel code string outputted from a receiving portion and the amplitude value of the multilevel code immediately before received according to predetermined decoding rules. The decoding portion separately outputs the command and the data. This allows various types of information to be multiplexed and transmitted with small delay.

12 Claims, 13 Drawing Sheets

F I G. 3

| | PRECEDING AMPLITUDE VALUE | CURRENT AMPLITUDE VALUE | DECODE SYMBOL |
|---|---|---|---|
| 1. | W OR Z | X | SYMBOL COM 41 RECEIVED |
| 2. | W OR Z | Y | SYMBOL COM 42 RECEIVED |
| 3. | — | W | "1" OF DATA 43 RECEIVED |
| 4. | — | Z | "0" OF DATA 43 RECEIVED |
| 5. | X | Y | SAME AS THE PRECEDING SYMBOL |
| 6. | Y | X | (THE SAME SYMBOL REPEATED) |
| 7. | X | X | SYMBOL CHANGED |
| 8. | Y | Y | AS COM 41 ⟷ COM 42 |

FIG. 5

|   | PRECEDING AMPLITUDE VALUE | CURRENT AMPLITUDE VALUE | DECODE SYMBOL |
|---|---|---|---|
| 1. | X | Z | SYMBOL COM 71 RECEIVED |
| 2. | Y OR Z | X | |
| 3. | X OR Z | Y | "1" OF DATA 72 RECEIVED |
| 4. | Y | Z | |
| 5. | X<br>Y<br>Z | X<br>Y<br>Z | "0" OF DATA 72 RECEIVED |

FIG. 7

| | PRECEDING AMPLITUDE VALUE | CURRENT AMPLITUDE VALUE | DECODE SYMBOL |
|---|---|---|---|
| 1. | X OR Y | W | SYMBOL COM 41 RECEIVED |
| 2. | X OR Y | Z | SYMBOL COM 42 RECEIVED |
| 3. | — | X | "1" OF DATA 43 RECEIVED |
| 4. | — | Y | "0" OF DATA 43 RECEIVED |
| 5. | W | Z | SAME AS THE PRECEDING SYMBOL (THE SAME SYMBOL REPEATED) |
| 6. | Z | W | |
| 7. | W | W | SYMBOL CHANGED AS COM 41 ⟷ COM 42 |
| 8. | Z | Z | |

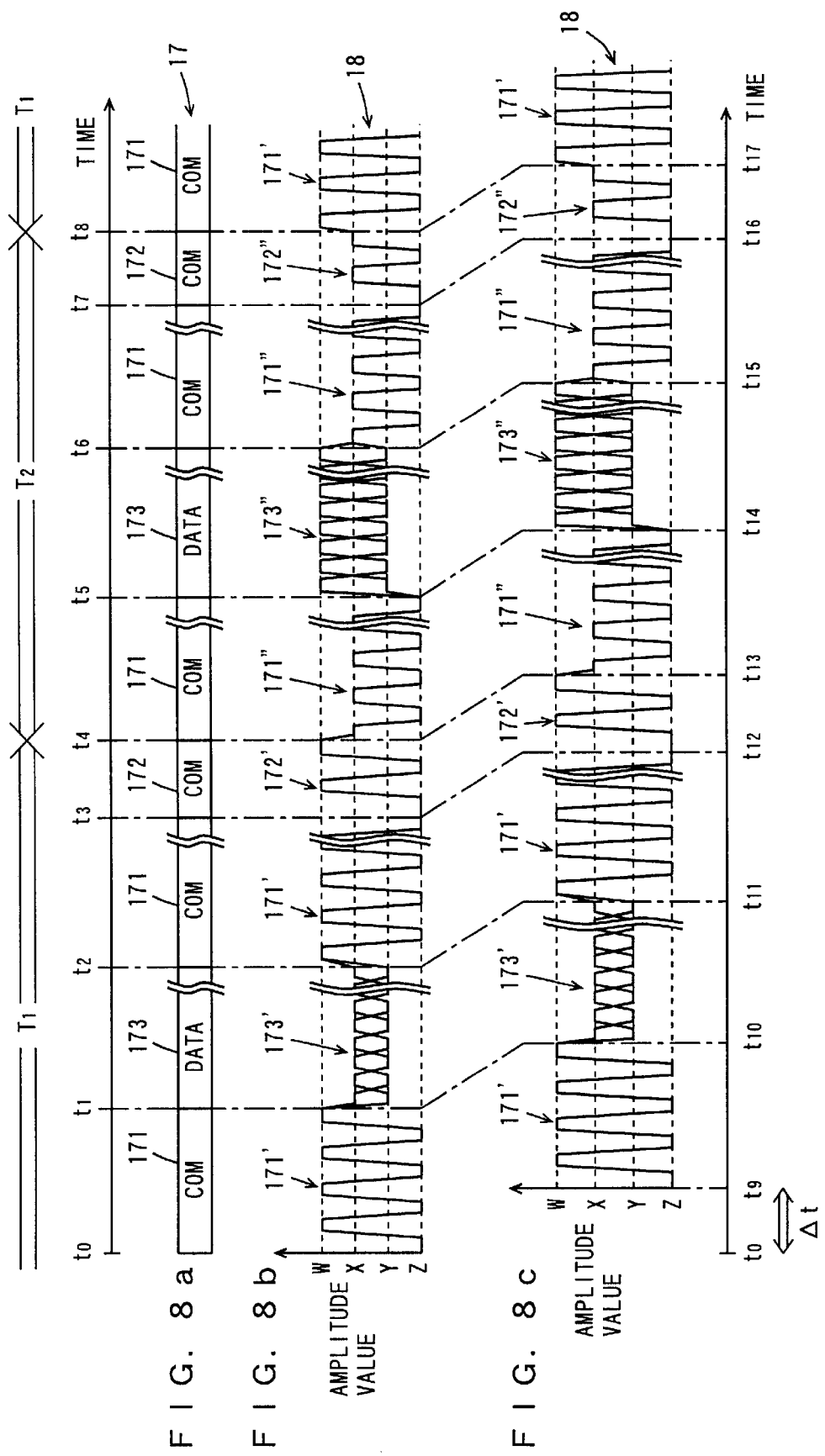

FIG. 9a

| | PRECEDING AMPLITUDE VALUE | CURRENT AMPLITUDE VALUE | DECODE SYMBOL |
|---|---|---|---|
| 1. | X, Y OR — IMMEDIATELY AFTER SWITCHING OF DECODING RULES | W | SYMBOL COM 171 RECEIVE |
| 2. | X, Y OR — IMMEDIATELY AFTER SWITCHING OF DECODING RULES | Z | SYMBOL COM 172 RECEIVED (RULES SWITCHED EVERY FOUR COUNTS) |
| 3. | — | X | "1" OF DATA 173 RECEIVED |
| 4. | — | Y | "0" OF DATA 173 RECEIVED |
| 5. | W | Z | THE SAME SYMBOL AS THE PRECEDING SYMBOL REPEATED |
| 6. | Z | W | THE SAME SYMBOL AS THE PRECEDING SYMBOL REPEATED |
| 7. | W | W | SYMBOL CHANGED AS COM 171 ⟷ COM 172 |
| 8. | Z | Z | SYMBOL CHANGED AS COM 171 ⟷ COM 172 |

FIG. 9b

| | PRECEDING AMPLITUDE VALUE | CURRENT AMPLITUDE VALUE | DECODE SYMBOL |
|---|---|---|---|
| 1. | W, Y OR IMMEDIATELY AFTER SWITCHING OF DECODING RULES | X | SYMBOL COM 171 RECEIVE |
| 2. | W, Y OR IMMEDIATELY AFTER SWITCHING OF DECODING RULES | Z | SYMBOL COM 172 RECEIVED (RULES SWITCHED EVERY FOUR COUNTS) |
| 3. | — | W | "1" OF DATA 173 RECEIVED |
| 4. | — | Y | "0" OF DATA 173 RECEIVED |
| 5. | X | Z | THE SAME SYMBOL AS THE PRECEDING SYMBOL REPEATED |
| 6. | Z | X | THE SAME SYMBOL AS THE PRECEDING SYMBOL REPEATED |
| 7. | X | X | SYMBOL CHANGED AS COM 171 ↔ COM 172 |
| 8. | Z | Z | SYMBOL CHANGED AS COM 171 ↔ COM 172 |

TRANSMISSION/RECEPTION METHOD AND DEVICE WHERE INFORMATION IS ENCODED AND DECODED ACCORDING TO RULES DEFINED BASED ON A RELATION BETWEEN A PREVIOUSLY-GENERATED MULTILEVEL CODE AND A CURRENTLY GENERATED MULTILEVEL

BACKGROUND OF THE INVENTION

1. Field of the Invention

This invention relates to transmission methods and more specifically to a method for transmitting a well direct-current (hereinafter referred to as DC) balanced multilevel code through a transmission path.

2. Description of the Background Art

In transmission devices, a transmitting end transmits data to be transmitted to a receiving end to a transmission path. The transmitting end may further transmit a command to the transmission path to instruct the receiving end to execute a predetermined operation. The data and the command may be multiplexed and transmitted as various types of information, as shown in FIG. 11. In a symbol string 111 of FIG. 11, COM 112 and COM 113 are symbols of commands. DATA 114 is a symbol of data.

When the transmitting end continuously transmits COM 112 of FIG. 11, the average value of the signal scintillates depending on the characteristics of the transmission path. That is, the transmission path cannot correctly transmit a signal with the same successive codes. Therefore, transmission path codes are adopted for the transmission device. The transmitting end converts a symbol (command or data) with excessively successive identical codes into a symbol with different codes moderately mixed according to predetermined encoding rules. Such encoding allows transmission of a well DC balanced signal to the transmission path.

One of the types of transmission path encoding is disclosed in U.S. Pat. No. 4,530,088. This patent discloses the so-called 4B5B encoding. Described below is the 4B5B encoding referring to FIG. 12. An encoding portion 121 of FIG. 12 is provided at a transmitting end. To the encoding portion 121, DATA 114 COM 112 or COM 113 of FIG. 11 are inputted. Data to be transmitted by the transmitting end is generated, being divided into four-bit blocks. Therefore, DATA 114 of four bits is represented as any one of 16 ($=2^4$) types of symbols. When two commands of COM 112 and COM 113 are to be transmitted, each of them represents only one symbol even though they are divided in blocks with a length corresponding to four bits. That is, the transmitting end can transmit 18 types of symbols in total as to DATA 114 COM 112 and COM 113 to the receiving end.

In 4B5B encoding, of 32 types of symbols represented with five bits, 18 types of symbols having good DC balance are preselected. The selected symbols of five bits are assigned to the symbols of four bits, thereby determining 4B5B encoding rules.

As shown in FIG. 13(a), the encoding portion 121 waits until the whole symbol of four bits (COM 112, COM 113 or DATA 114) is inputted. The encoding portion 121 encodes based on the 4B5B encoding rules, thereby converting the symbol of four bits to a symbol of five bits (represented as "Xcode" in the drawing) 115. This symbol of five bits 115 is transmitted through the transmission path to the receiving end. The receiving end is provided with a decoding portion, which, as shown in FIG. 13(b), waits until the whole symbol of five bits 115 is inputted. The decoding portion decodes based on the 4B5B encoding rules, and thereby restores the symbol of five bits 115 to its original symbol of four bits (DATA 114, etc.).

As described above, even when a poorly DC balanced signal string is generated at the transmitting end, adopting the transmission path codes allows a well DC balanced signal string to be transmitted to the transmission path. Therefore, information can be transmitted correctly between the transmitting end and the receiving end. Furthermore, it is also possible in the 4B5B encoding to multiplex a plurality of types of information (typically, command and data).

However, in the 4B5B encoding, the transmitting and receiving ends have to wait until the whole symbols of four bits and five bits are completely inputted. As a result, transmission delay in encoding and decoding is caused. Therefore, in a data transmission device with limited transmission delay, it is disadvantageously impossible to make time for processing of converting a signal string into a well DC balanced signal string.

Note that in the above U.S. patent, the signal string of four bits is inputted in parallel into the encoding portion 121 and the signal string of five bits is outputted in parallel from the encoding portion 121. However, the front end of the encoding portion 121 performs serial-parallel conversion, in which transmission delay occurs. That is, in the conventional transmission path encoding, the above transmission delay occurs in any part of the processing.

SUMMARY OF THE INVENTION

Therefore, an object of the present invention is to a transmission method and a transmitting/receiving device capable of multiplexing various types of information and transmitting the information with small transmission delay. The object of the present invention is achieved by the following first to fortieth aspects.

A first aspect is directed to a method for transmitting multilevel codes represented by a plurality of amplitude values from a transmitting end to a receiving end through a transmission path. The method includes, at the transmitting end, encoding information to be transmitted to the receiving end according to encoding rules defined based on a relation between a previously-generated multilevel code and a currently-generated multilevel code, generating a multilevel code string, and transmitting the generated multilevel code string to the transmission path. The method also includes, at the receiving end, receiving the multilevel code string through the transmission path, decoding the received multilevel code string according to decoding rules corresponding to the encoding rules based on a relation between a currently-received multilevel code and a previously-received multilevel code, and reproducing the information.

In accordance with the first aspect, the transmitting end encodes information based on a relation between a previous multilevel code and the current multilevel code, and transmits to the receiving end. That is, unlike in the 4B5B encoding method, the transmitting end of the present invention can encode information without waiting until the whole block of four bits is completely inputted, thereby allowing short processing time from occurrence of information to be transmitted to the end of encoding in the transmitting end. On the other hand, the receiving end can decode and reproduce the information from the transmitting end based on the currently-received multilevel code and a previously-received multilevel code. That is, unlike in the 4B5B encoding method, the receiving end can decode and reproduce information without waiting until the whole block of five bits is completely inputted, thereby allowing a short processing time from the time when the multilevel codes are received to the end of decoding in the receiving end. Therefore, according to the transmission method of the first aspect, it is possible to transmit information with a small amount of delay.

Further, in accordance with the first aspect, the transmitting end converts transmission information to multilevel codes. The multilevel codes can create a large number of relationship patterns of combination between a previous multilevel code and the current multilevel code. It is therefore possible to assign different amplitude value patterns to various types of information, thereby allowing transmission and multiplexing of various types of information with a small amount of delay.

According to a second aspect, in the first aspect, the transmitting end encodes the information according to encoding rules defined based on a relation between a currently-generated multilevel code and a multilevel code generated immediately before and the receiving end decodes based on a relation between the currently-received multilevel code and a multilevel code received immediately after.

In accordance with the first aspect, the transmitting end and the receiving end have to latch the amplitude values of previous multilevel codes. However, according to the second aspect, the transmitting end and the receiving end use the amplitude of the preceding multilevel code for encoding and decoding, therefore eliminating the need for storing the plurality of amplitude values. This allows the structure of the transmitting and receiving devices to be downsized.

According to a third aspect, in the first aspect, the information includes symbols of a plurality of types; the transmitting end encodes the symbols of the plurality of types into the multilevel codes of a same pattern according to the encoding rules to generate the multilevel code string; and a change from one symbol to another symbol is represented by a phase change of the same pattern in the generated multilevel code string.

In accordance with the third aspect, the transmitting end changes a phase in a same pattern to inform the receiving end of a change from a symbol to another symbol. Therefore, once detecting the phase change, the receiving end can decode and reproduce the other symbol. The phase change can be detected with the amplitude values of the previous and current multilevel codes, as in the first aspect. That is, according to the third aspect, it is possible to multiplex and transmit information with a small amount of delay, as in the first aspect.

According to a fourth aspect, in the first aspect, the transmitting end generates the multilevel code string with same codes not excessively successive and transmits the multilevel code string to the transmission path.

In accordance with the fourth aspect, excessively successive same codes do not exist in the multilevel code string, thereby allowing good DC balance of the multilevel code string and correct information transmission from the transmitting end to the receiving end.

According to the fifth aspect, in the first aspect, the transmitting end multiplexes symbols of a plurality of types as the information, and encodes the multiplexed symbols according to the encoding rules and generates the multilevel code string.

In accordance with the fifth aspect, the symbols of the plurality of types are multiplexed in a step before encoding. It is therefore possible to easily generate the multilevel code string with the symbols of the plurality of types multiplexed.

According to a sixth aspect, in the first aspect, the transmitting end encodes at least once during a predetermined time interval using a maximum amplitude value and/or a minimum amplitude value and generates the multilevel code string.

In the sixth aspect, the receiving end receives the maximum and/or minimum amplitude value during the predetermined time interval. In other words, the receiving end is notified by the transmitting end of the maximum and/or minimum amplitude value of the multilevel code. It is thus possible to correctly identify each amplitude value of the multilevel code.

According to a seventh aspect, in the first aspect, the transmitting end and the receiving end change the encoding rules and the decoding rules as required.

In accordance with the seventh aspect, the encoding rules and the decoding rules are dynamically changed, allowing transmission of the optimal multilevel code string to the transmission path.

According to an eighth aspect, in the first aspect, the transmitting end encodes a predetermined command as the information into the multilevel code string and changes the encoding rules based on the command; and the receiving end reproduces the predetermined command and changes the decoding rules based on the command.

In the eighth aspect, the timings of changing the encoding rules and the decoding rules can be synchronized based on the predetermined command. It is thus possible to correctly transmit information between the transmitting and receiving ends even if these rules are changed.

According to a ninth aspect, in the first aspect, the transmitting end changes the number of amplitude values to be used for the multilevel codes as required.

In accordance with the ninth aspect, the number of amplitude values are dynamically changed, thereby allowing transmission of the optimal multilevel code string to the transmission path.

According to a tenth aspect, in the first aspect, the transmitting end encodes a predetermined command as the information into a multilevel code string and changes the encoding rules and the number of amplitude values to be used for the multilevel codes based on the command; and the receiving end reproduces the predetermined command and changes the decoding rules and the number of amplitude values to be used for the multilevel codes.

In the tenth aspect, the combination of the encoding rules and the decoding rules and the number of levels for use in encoding and decoding are dynamically changed, thereby also allowing transmission of the optimal multilevel code string to the transmission path.

An eleventh aspect is directed to a method for optically transmitting multilevel codes represented by a plurality of amplitude values from a transmitting end to a receiving end through an optical transmission path. The method includes, at the transmitting end, encoding information to be transmitted to the receiving end according to encoding rules defined based on a relation between a previously-generated multilevel code and a currently-generated multilevel code, and generating a multilevel code string, performing electrical/optical conversion to the generated multilevel code string, to generate an optical signal, and transmitting the generated optical signal to the optical transmission path. The method also includes, at the receiving end, performing optical/electrical conversion to the optical signal inputted through the optical transmission path, and reproducing the multilevel code string, and decoding the reproduced multilevel code string according to decoding rules corresponding to the encoding rules based on a relation between a currently-reproduced multilevel code and a previously-reproduced multilevel code, and reproducing information.

According to a twelfth aspect, in the eleventh aspect, the transmitting end encodes the information according to encoding rules defined based on a relation between the currently-generated multilevel code and a multilevel code generated immediately before; and the receiving end decodes based on a relation between the currently-reproduced multilevel code and a multilevel code reproduced immediately before.

According to a thirteenth aspect, in the eleventh aspect, the information includes symbols of a plurality of types; the transmitting end encodes the symbols of the plurality of types of symbols into the multilevel codes of a same pattern according to the encoding rules to generate the multilevel code string; and a change from one symbol to another symbol is represented by a phase change of the same pattern in the generated multilevel code string.

According to a fourteenth aspect, in the eleventh aspect, the transmitting end generates the multilevel code string with same codes not excessively successive and transmits the multilevel code string to the optical transmission path.

According to a fifteenth aspect, in the eleventh aspect, the transmitting end multiplexes symbols of a plurality of types as the information, and encodes the multiplexed symbols according to the encoding rules and generates the multilevel code string.

According to a sixteenth aspect, in the eleventh aspect, the transmitting end encodes at least once during a predetermined time interval using a maximum amplitude value and/or a minimum amplitude value and generates the multilevel code string.

According to a seventeenth aspect, in the eleventh aspect, the transmitting end and the receiving end change the encoding rules and the decoding rules as required.

According to an eighteenth aspect, in the eleventh aspect, the transmitting end encodes a predetermined command as the information into the multilevel code string and changes the encoding rules based on the command; and the receiving end reproduces the predetermined command and changes the decoding rules based on the command.

According to a nineteenth aspect, in the eleventh aspect, the transmitting end changes the number of amplitude values to be used for the multilevel codes as required.

According to a twentieth aspect, in the eleventh aspect, the transmitting end encodes a predetermined command as the information into the multilevel code string and changes the encoding rules and the number of amplitude values to be used for the multilevel codes based on the command; and the receiving end reproduces the predetermined command and changes the decoding rules and the number of amplitude values to be used for the multilevel codes based on the command.

A twenty-first aspect is directed to a device for transmitting multilevel codes represented by a plurality of amplitude values from a transmitting end to a receiving end through a transmission path. The transmitting end comprises an encoding portion for encoding information to be transmitted to the receiving end according to encoding rules defined based on a relation between a previously-generated multilevel code and a currently-generated multilevel code, and generating a multilevel code string, and a transmitting portion for transmitting the generated multilevel code string to the transmission path. The receiving end comprises a receiving portion for receiving the multilevel code string through the transmission path, and a decoding portion for decoding the multilevel code string received by the receiving portion according to decoding rules corresponding to the encoding rules based on a relation between a multilevel code currently received by the receiving portion and a multilevel code previously received by the receiving portion, and reproducing the information.

According to a twenty-second aspect, in the twenty-first aspect, the encoding portion encodes the information according to encoding rules defined based on a relation between the currently-generated multilevel code and a multilevel code generated immediately before; and the decoding portion decodes based on a relation between the multilevel code currently received by the receiving portion and a multilevel code received immediately before by the receiving portion.

According to twenty-third aspect, in the twenty-first aspect, the information includes symbols of a plurality of types; the encoding portion encodes the symbols of the plurality of types into the multilevel codes of a same pattern according to the encoding rules to generate the multilevel code string; and a change from one command to another command is represented by a phase change of the same pattern in the generated multilevel code string.

According to a twenty-fourth aspect, in the twenty-first aspect, the encoding portion generates the multilevel code string with same codes not excessively successive.

According to a twenty-fifth aspect, in the twenty-first aspect, the transmitting end further comprises a multiplexing portion for multiplexing symbols of a plurality of types as the information, and the encoding portion encodes the symbols multiplexed by the multiplexing portion according to the encoding rules and generates the multilevel code string.

According to a twenty-sixth aspect, in the twenty-first aspect, the encoding portion encodes at least once during a predetermined time interval using a maximum amplitude value and/or a minimum amplitude value and generates the multilevel code string. In addition the receiving end further comprises a normalizing portion for normalizing an amplitude value of the multilevel code string received by the receiving portion based on the maximum amplitude value and/or the minimum amplitude value transmitted at the predetermined intervals.

In the twenty-sixth aspect, the receiving end is notified by the transmitting end of the maximum amplitude value and/or the minimum amplitude value of the multilevel code. The normalizing portion normalizes the receive level of the receiving portion based on the maximum value and/or the minimum value, thereby correcting the receive level of the receiving portion. The receiving portion can therefore supply a multilevel code string with correct amplitude values.

According to a twenty-seventh aspect, in the twenty-first aspect, the encoding portion and the decoding portion change the encoding rules and the decoding rules as required.

According to a twenty-eighth aspect, in the twenty-first aspect, the encoding portion encodes a predetermined command as the information into the multilevel code string and changes the encoding rules based on the command; and the decoding portion reproduces the predetermined command and changes the decoding rules based on the command.

According to a twenty-ninth aspect, in the twenty-first aspect, the encoding portion and the decoding portion change the number of amplitude values to be used for the multilevel codes as required.

According to a thirtieth aspect, in the twenty-first aspect, the encoding portion encodes a predetermined command as the information into the multilevel code string and changes the encoding rules and the number of amplitude values to be used for the multilevel codes based on the command; and the decoding portion reproduces the predetermined command and changes the decoding rules and the number of amplitude values to be used for the multilevel codes based on the command.

A thirty-first aspect is directed to a device for optically transmitting multilevel codes represented by a plurality of amplitude values from a transmitting end to a receiving end through an optical transmission path.

The transmitting end comprises:
an encoding portion for encoding information to be transmitted to the receiving end according to encoding rules defined based on a relation between a previously-generated multilevel code and a currently-generated multilevel code, and generating a multilevel code string; and
an electrical/optical converting portion for performing electrical/optical conversion to the multilevel code string generated by the encoding portion to generate an optical signal and transmitting the optical signal to the optical transmission path.

The receiving end comprises:
an optical/electrical converting portion for receiving the optical signal through the optical transmission path, performing optical/electrical conversion to the optical signal, and reproducing the multilevel code string; and
a decoding portion for decoding the multilevel code string reproduced by the optical/electrical converting portion according to decoding rules corresponding to the encoding rules based on a relation between a multilevel code currently-reproduced by the optical/electrical converting portion and a multilevel code previously reproduced by the optical/electrical converting portion, and reproducing information.

According to a thirty-second aspect, in the thirty-first aspect, the encoding portion encodes the information according to the encoding rules defined based on a relation between the currently-generated multilevel code and a multilevel code generated immediately before; and the decoding portion decodes based on a relation between the multilevel code currently reproduced by the optical/electrical converting portion and a multilevel code reproduced immediately before by the optical/electrical converting portion.

According to a thirty-third aspect, in the thirty-first aspect, the information includes symbols of a plurality of types; the encoding portion encodes the symbols of the plurality of types into the multilevel codes of a same pattern according to the encoding rules to generate the multilevel code string; and a change from one symbol to another symbol is represented by a phase change of the same pattern in the generated multilevel code string.

According to a thirty-fourth aspect, in the thirty-first aspect, the encoding portion generates the multilevel code string with same codes not excessively successive.

According to a thirty-fifth aspect, in the thirty-first aspect, the transmitting end comprises a multiplexing portion for multiplexing symbols of a plurality of types as the information, and the encoding portion encodes the symbols multiplexed by the multiplexing portion according to the encoding rules and generates the multilevel code string.

According to a thirty-sixth aspect, in the thirty-first aspect, the encoding portion encodes at least once during a predetermined time interval using a maximum amplitude value and/or a minimum amplitude value and generates the multilevel code string. In addition, the receiving end further comprises a normalizing portion for normalizing an amplitude value of the multilevel code string received by the receiving portion based on the maximum amplitude value and/or the minimum amplitude value transmitted at the predetermined intervals.

According to a thirty-seventh aspect, in the thirty-first aspect, the encoding portion and the decoding portion change the encoding rules and the decoding rules as required.

According to a thirty-eighth aspect, in the thirty-first aspect, the encoding portion encodes a predetermined command as the information into the multilevel code string and changes the encoding rules based on the command; and the decoding portion reproduces the predetermined command and changes the decoding rules based on the command.

According to a thirty-ninth aspect, in the thirty-first aspect, the encoding portion and the decoding portion change the number of amplitude values to be used for the multilevel codes as required.

According to a fortieth aspect, in the thirty-first aspect, the encoding portion encodes a predetermined command as the information into the multilevel code string and changes the encoding rules and the number of amplitude values to be used for the multilevel codes based on the command; and the decoding portion reproduces the predetermined command and changes the decoding rules and the number of amplitude values to be used for the multilevel codes based on the command.

These and other objects, features, aspects and advantages of the present invention will become more apparent from the following detailed description of the present invention when taken in conjunction with the accompanying drawings.

DESCRIPTION OF THE DRAWINGS

FIG. 3 shows an example of decoding rules in quaternary transmission;

FIG. 5 shows an example of decoding rules in ternary transmission;

FIG. 7 shows decoding rules corresponding to the encoding method of FIG. 6;

FIGS. 8a to 8c show an example of an encoding method in a transmission method of a third embodiment;

FIGS. 9a and 9b show decoding rules corresponding to the encoding method of FIG. 8;

DESCRIPTION OF THE PREFERRED EMBODIMENTS (First Embodiment)

Figure 1:
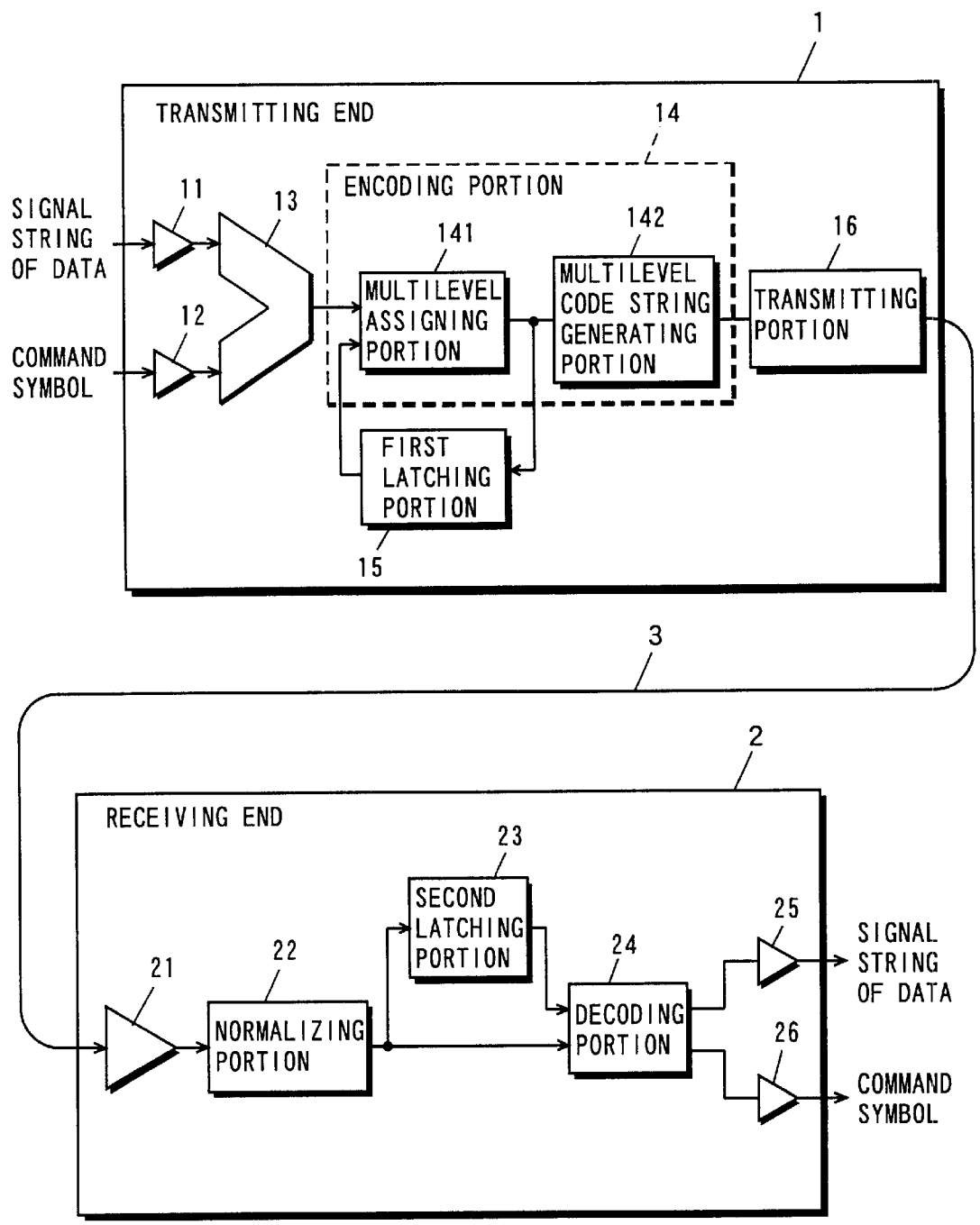
FIG. 1 shows the block structure of a transmission device to which a transmission method according to first to third embodiments is applied.

FIG. 1 is a block diagram of a transmission device to which a transmission according to first to third embodiments are applied. In the transmission device, a transmitting end 1 and a receiving end 2 are connected communicably to each other through a wired or a wireless transmission path 3.

Described first is the structure of the transmitting end 1. The transmitting end 1 includes a first input portion 11, a second input portion 12, a selector 13, an encoding portion 14, a first latching portion 15 and a code string transmitting portion 16. Sequentially inputted to the first input portion 11 is a data string to be transmitted to the receiving end 2. The first input portion 11 outputs the inputted data string to the selector 13. Sequentially inputted to the second input portion 12 is a command symbol. The second input portion 12 outputs the inputted command symbol to the selector 13.

The selector 13 multiplexes the inputted data string and the inputted command symbol and generates a multiplexed symbol string(s). The generated multiplexed symbol string (s) is outputted to the encoding portion 14. It should be noted that when the data string and the command symbol are inputted in the selector 13, their signal formats (amplitude, symbol length, etc.) are not necessarily uniform. In this case, the selector 13 unifies the signal formats of the inputted data string and command symbol. On the other hand, when both signal formats coincide with each other, the selector 13 multiplexes the inputted data string and command symbol as they are.

The encoding portion 14 is driven by the inputted multiplexed symbol string(s) to perform encoding which will be described below. For the purpose of encoding, the encoding portion 14 includes a multilevel assigning portion 141 and a multilevel code string generating portion 142. The multilevel assigning portion 141 detects a multiplexed symbol from the inputted multiplexed symbol string(s).

The multilevel assigning portion 141 assigns a predetermined amplitude value to each detected symbol according to predetermined encoding rules. The amplitude value is predetermined according to a multilevel code to be generated. The amplitude value to be assigned this time (hereinafter referred to as "current amplitude value") is determined based on a symbol detected this time and an amplitude value the multilevel assigning portion 141 previously assigned (hereinafter referred to as "previous amplitude value"). The previous amplitude value is latched in the first latching portion 15. The multilevel assigning portion 141 typically assigns the current amplitude value referring to a table in which the encoding rules are presented, but can also calculate and assign the current amplitude value through operation by a state machine, a logical circuit or a CPU. The current amplitude value is outputted from the multilevel assigning portion 141 to the first latching portion 15 and the multilevel code string generating portion 142. The multilevel code string generating portion 142 generates a multilevel code string according to the inputted amplitude, and outputs the generated multilevel code string to the transmitting portion 16.

It should be noted that it can be assumed in the above description that the multilevel assigning portion 141 assigns a digitally-represented logical value as the amplitude value and that the multilevel code string generating portion 142 generates a multilevel code string having analog waveforms with the logical value. However, according to design requirements of the transmission device, the multilevel assigning portion 141 may generate a multilevel code string having analog waveforms directly from the inputted multiplexed symbol string(s) and a previous amplitude value.

The first latching portion 15 latches the inputted current amplitude value. This amplitude value is used by the multilevel assigning portion 141 as a previous amplitude value. It should be noted that the first latching portion 15 latches the predetermined number of previous amplitude values according to design requirements of the transmission device. Note that when the current amplitude value is assigned by use of the preceding amplitude, only one amplitude value is enough to be latched in the first latching portion 15. In this case, the transmitting end 1 can be structured small in size, which is more preferable. It is assumed in the following description that the first latching portion 15 latches only one amplitude value, that is, the preceding amplitude.

Inputted to the transmitting portion 16 is the multilevel code string outputted from the encoding portion 14. The transmitting portion 16 outputs the inputted multilevel code string as a transmission path code to the transmission path 3.

Described next is the structure of the receiving end 2. The receiving end 2 includes a receiving portion 21, a normalizing portion 22, a second latching portion 23, a decoding portion 24, a first output portion 25 and a second output portion 26. The receiving portion 21 receives the multilevel code string transmitted through the transmission path 3 and outputs the multilevel code string to the normalizing portion 22. The normalizing portion 22 is typically composed of an Automatic Gain Controller (AGC) or an Automatic Threshold Controller (ATC), and when an AGC is adopted, the normalizing portion 22 detects the amplitude value of an outputted signal from an internal variable gain amplifier (not shown) and generates a control signal based on the detected amplitude value. The generated control signal is fed-back to the variable gain amplifier. This operation normalizes a variable receive signal level, correcting the multilevel code string at a correct amplitude value. The normalized multilevel code string is sequentially outputted to the second latching portion 23 and the decoding portion 24.

When the multilevel code string outputted from the receiving portion 21 is inputted, the second latching portion 23 latches its amplitude value. The second latching portion 23 also latches several amplitude values previously inputted. The latched amplitude values are used when the decoding portion 24 performs decoding.

The decoding portion 24 is driven by the multilevel code string outputted from the receiving portion 21, performing decoding and reproducing processing according to decoding rules corresponding to the encoding rules used by the encoding portion 14. The decoding portion 24 operates at predetermined time intervals to detect the amplitude value of each multilevel code outputted from the receiving portion 21, that is, the amplitude of the multilevel codes received this time (hereinafter referred to as "current amplitude value). The decoding portion 24 further obtains a previous amplitude value latched in the second latching portion 23. The decoding rules define a relation between the current amplitude value and a previous amplitude value and a symbol to be decoded (hereinafter referred to as decode symbol). The decoding portion 24 decodes and reproduces the data string or the command symbol from the detected current amplitude value and a previous amplitude value obtained from the second latching portion 23, according to the decoding rules. For the purpose of decoding and reproducing, the decoding portion 24 may refer to a table in which the recording rules are presented and operate using a state machine, a logical circuit or a CPU. The decoding portion 24 further separates the reproduced data string and command symbol to output to the first output portion 25 and the second output portion 26.

It should be noted that when the symbol to be reproduced is derived from the current and previous amplitude values, only one amplitude value is enough to be latched in the second latching portion 23. In this case, the receiving end 2 can be structured to be small in size, which is more preferable.

The first output portion 25 and the second output portion 26 output the data string and command symbol outputted from the decoding portion 24 to outside the receiving end 2.

Figure 2:
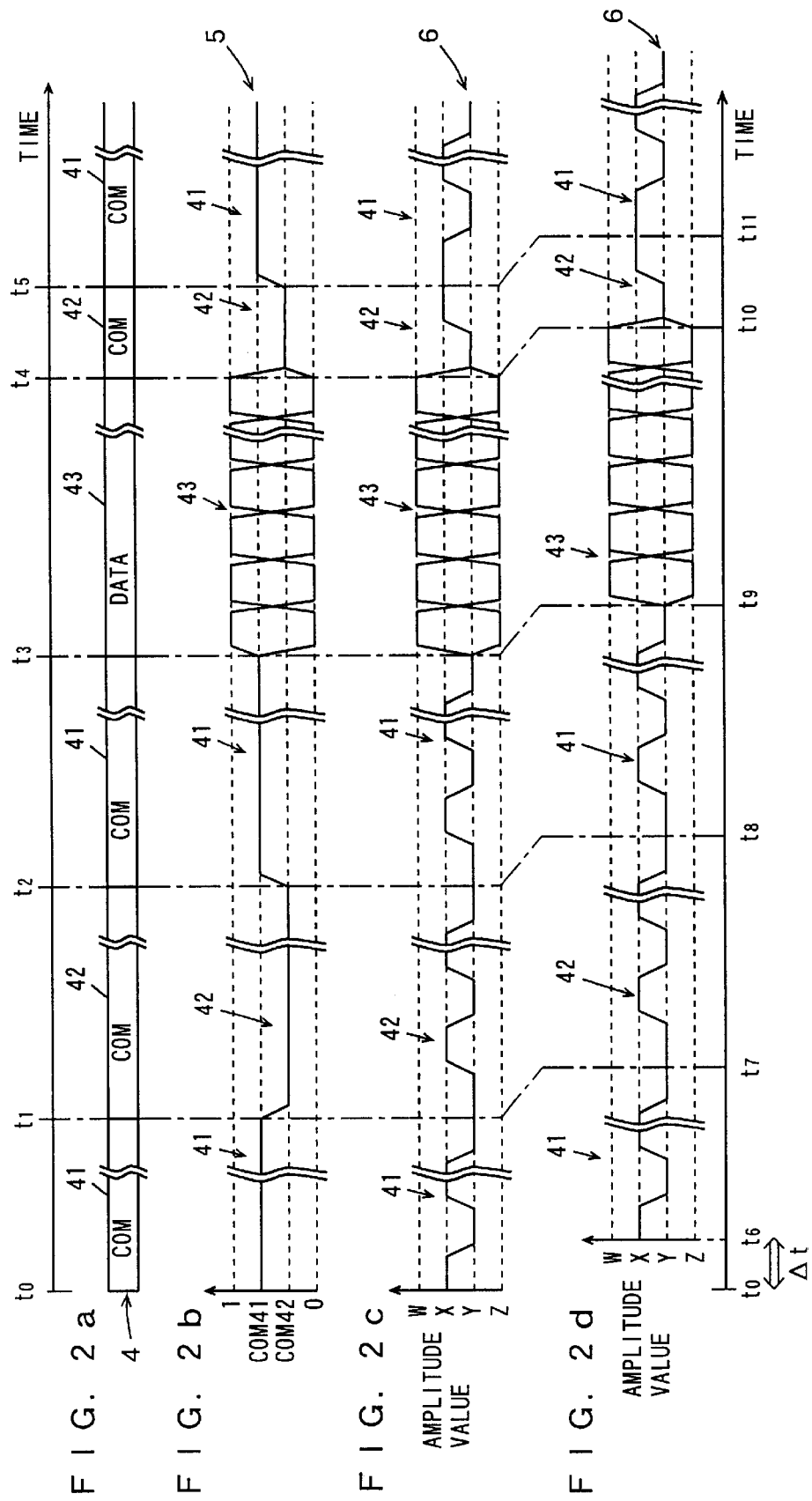
FIGS. 2a to 2d show examples of encoding rules in quaternary transmission.

Described next are two specific examples of the transmission method in the transmission device of FIG. 1. Described in the first specific example are encoding and decoding in quaternary transmission. FIGS. 2a to 2d are diagrams for describing the encoding rules of the transmitting end 1 of FIG. 1. Specifically, FIG. 2a shows a symbol string 4 generated by the selector 13 by multiplexing inputted information by the selector 13. In the symbol string 4 of FIG. 2a, COM 41 and COM 42, which are different command symbols from each other, and DATA 43, which is a data string, are multiplexed. The symbol string 4 includes COM 41 between time $t_0$ and $t_1$, time $t_2$ and $t_3$, and time is and afterward; COM 42 between time $t_1$ and $t_2$, and time $t_4$ and $t_5$; and DATA 43 between time $t_2$ and $t_4$.

FIG. 2b shows an example of a multiplexed signal string 5 (refer to a solid line in the drawing), which is a time waveform of the symbol string 4 of FIG. 2a. As shown in FIG. 2b, successive same codes occur in the multiplexed signal string 5 during time periods when COM 41 and COM 42 are multiplexed, that is, between time $t_0$ and $t_1$, time $t_1$ and $t_2$, time $t_2$ and $t_3$, and time $t_4$ and $t_5$. Therefore, the encoding portion 14 performs the above described encoding to represent COM 41, COM 42 and DATA 43 and generates a multilevel code string 6 with same codes not excessively successive. FIG. 2c shows a time waveform (refer to a solid line in the drawing) of the multilevel code string 6 outputted from the encoding portion 14 when the multiplexed signal string 5 of FIG. 2b is inputted to the encoding portion 14. Since quaternary transmission is assumed in the first example, the multilevel code string 6 is represented by four amplitude values. In the present example, "W", "X", "Y" and "Z" (where W>X>Y>Z) are used as these four amplitude values.

As shown in FIG. 2c, COM 41 and COM 42 are represented by an alternation of "X" and "Y". This allows for the generation of the multilevel code string 6 with same codes not excessively successive. An important point here is how to represent a change from COM 41 to COM 42. In the present example, a changing point between them is represented by two successive multilevel codes with same level. For example, "Y" successively repeats twice across time $t_1$. "Y" successively repeats twice across time $t_2$ and "X" successively repeats twice across time $t_5$. In this way, the present encoding rules define successive same codes, that is, an "X" to "X" transition or a "Y" to "Y" transition as a change from COM 41 to COM 42 or a change from COM 42 to COM 41. Note here that "Y" successively repeats twice between time $t_1$ and time $t_2$ to represent a change from COM 41 to COM 42 and a change from COM 42 to COM 41. It should be noted that the present encoding rules can represent different command symbols even though their amplitude values change in the same manner. The receiving end 2 can decode and reproduce different command symbols by decoding and reproducing processing which will be described later, even though the relations between a previous amplitude value and the current amplitude value are same.

When COM 41 and COM 42 have the same pattern, if FIG. 2c is seen from different point of view, changes from COM 41 to COM 42 and from COM 42 to COM 41 are represented by a phase with the same pattern. For example, the phase does not change in the time waveform until time $t_1$. However, in the time waveform immediately after time $t_1$, frequency and amplitude are the same, but the phase is shifted. That is, a phase change occurs in the multilevel code string 6 after time $t_1$. This phase change represents a change from COM 41 to COM 42 at time $t_1$. The same also goes for time $t_1$ and time $t_5$.

COM 41 and COM 42 may be represented by other patterns as long as a condition that successive same codes repeat not excessively is satisfied. The pattern is determined according to the characteristics of the transmission path 3. That is, the alternating pattern is a preferred example only.

DATA 43 is represented by "W" and "Z". Inputted to the encoding portion 14 is DATA 43 represented by "0" and "1". Therefore, DATA 43 may be inputted to the encoding portion 14 without successive same codes. In this case, the encoding portion 14 does not have to assign multilevel codes to DATA 43. That is, there may be "W"="1" and "Z"="0". This allows the encoding portion 14 to perform encoding without unnecessary loads.

Described next is encoding rules in a transition from a data string to each command symbol. A transition from "W" or "Z" to "X" is defined as a transition from DATA 43 to COM 41. A transition from "W" or "Z" to "Y" is defined as a transition from DATA 43 to COM 42.

It should be noted that the multiplexed signal string 5 has a signal format represented by a plurality of levels in the present embodiment. However, for example, the multiplexed signal string 5 may be transmitted by making a corresponding signal line effective in response to selection of each symbol. That is, the present invention has nothing to do with which signal format is adopted so long as information on which symbol is selected can be transmitted quickly and independently.

Described next is detailed operation of the transmitting end 1 referring to FIGS. 2a to 2d. As described above, the selector 13 multiplexes the data string and the command symbol inputted through the first input portion 11 and the second input portion 12 and generates the symbol string 4 of FIG. 2a. The generated symbol string 4 is outputted as a multiplexed signal string(s) 5 having the time waveform of FIG. 2b to the multilevel assigning portion 141.

Between time $t_0$ and $t_1$, the multilevel assigning portion 141 detects the symbol COM 41. The multilevel assigning portion 141 further gets the preceding amplitude value latched in the first latching portion 15. When getting "X", the multilevel assigning portion 141 assigns "Y" to the detected COM 41. This "Y" is outputted to the first latching portion 15 and the multilevel code string generating portion 142. On the other hand, when getting "Y" as the preceding amplitude value, the multilevel assigning portion 141 assigns "X" to the detected COM 41. "X" is outputted to the first latching portion 15 and the multilevel code string generating portion 142. As a result, the multilevel code string generating portion 142 generates the multilevel code string 6 composed of an alternation of the amplitude values "X" and "Y" between time $t_0$ and $t_1$.

The multilevel assigning portion 141 detects symbol COM 42 from the inputted multiplexed signal string 5 immediately after time $t_1$. At this time, the first latching portion 15 latches "X" or "Y" as the preceding amplitude value. In this case, the multilevel assigning portion 141 automatically assigns the preceding amplitude value "X" or "Y" to the detected COM 42. FIG. 2c shows a case where the preceding amplitude value is "Y". As a result, the multilevel code string generating portion 142 generates the multilevel code string 6 having a pattern of two successive "Y"s across time $t_1$.

The multilevel assigning portion 141 detects COM 42 between time $t_1$ and time $t_2$. Therefore, the multilevel assigning portion 141 alternately assigns "Y" and "X" during this time period and outputs to the first latching portion 15 and the multilevel code string generating portion 142. As a result, the multilevel code string 6 including the alternation of "Y" and "X" is generated between time $t_1$ and $t_2$.

The multilevel assigning portion 141 detects symbol COM 41 between time $t_2$ and $t_3$. During this time period, the amplitude values are assigned in the same manner as described above, and as a result, the multilevel code string 6 including the alternation of "Y" and "X" is generated between time $t_2$ and $t_3$. However, as described above, same code level "Y" repeats twice across time $t_2$ in order to represent a change to COM 41. This repeat changes the phases of the alternating pattern between time $t_1$ and $t_2$ and the alternating pattern between time $t_2$ and $t_3$ to represent a change from COM 42 to COM 41.

The multilevel assigning portion 141 detects DATA 43 immediately after time $t_3$. At this time, the first latching portion 15 latches "X" or "Y" as the preceding amplitude value. In this case, the multilevel assigning portion 141 assigns the amplitude value "W" or "Z" to the detected DATA 43. Generated thereafter is the multilevel code string 6 represented by a sequence of "W" and "Z".

The multilevel assigning portion 141 detects COM 42 immediately after time $t_4$. At this time, the first latching portion 15 holds "W" or "Z" as the preceding amplitude value. The multilevel assigning portion 141 thus knows a change from DATA 43 to COM 42. In this case, the multilevel assigning portion 141 initially assigns the amplitude value "Y". As a result, the amplitude value changes from "W" or "Z" to "Y" across time $t_4$, thereby representing the change from DATA 43 to COM 42. "X" and "Y" are alternately assigned after the initial amplitude value "Y" is assigned until time $t_5$ according to the above encoding rules.

When a change occurs from DATA 43 to COM 41, although not shown in FIG. 2c, the multilevel assigning portion 141 initially assigns "X", as described above. Further, COM 41 is detected after time $t_5$, and how to assign the amplitude values at this time has been described above. Therefore, its description is omitted.

As a result, the multilevel code string 6 of FIG. 2c is generated by the multilevel code string generating portion 142 and outputted to the transmitting portion 16. The transmitting portion 16 outputs the inputted multilevel code string 6 to the transmission path 3.

FIG. 3 shows decoding rules previously set in the decoding portion 24 of FIG. 1. The decoding rules of FIG. 3 list the preceding and current amplitude values and the decode symbols. The decoding rules are now specifically described, referring to FIG. 3 from above:

1. When the preceding amplitude value is "W" or "Z" and the current amplitude value is "X", COM 41 is received.
2. When the preceding amplitude value is "W" or "Z" and the current one is "Y", COM 42 is received.
3. When the current amplitude value is "W", "1" of DATA 43 is received.
4. When the current amplitude value is "Z", "0" of DATA 43 is received.
5. When the preceding amplitude value is "X" and the current amplitude value is "Y", the decode symbol is the same as the preceding decode symbol.
6. When the preceding amplitude value is "Y" and the current amplitude value is "X", the decode symbol is the same as the preceding decode symbol.
7. When both of the preceding and current amplitude values are "X", the command symbol is changed from COM 41 to COM 42 or from COM 42 to COM 41.
8. Also when both of the preceding and current amplitude values are "Y", the command symbol is changed, as described above.

Described next is detailed operation of the decoding portion 24 of FIG. 1 referring to FIGS. 2a to 2d and FIG. 3. Operation of the components other than the decoding portion 24 will be described in a simple way because it is not important in the present embodiment and clear from the above description.

The multilevel code string 6 is transmitted through transmission path 3, and therefore is sequentially inputted to the decoding portion 24 with delay $\Delta t$ relative to time $t_0$. The decoding portion 24 detects the amplitude value of the inputted multilevel code string 6. Since the multilevel code string 6 outputted from the receiving portion 21 is inputted to the second latching portion 23, latched is the same amplitude value as the preceding amplitude value detected by decoding portion 24. The decoding portion 24 gets the preceding amplitude value from the second latching portion 23 every time it detects an amplitude value.

Between time $t_6$ and $t_7$, the decoding portion 24 alternately detects "X" and "Y" as the current amplitude value (refer to FIG. 2d) and alternately obtains "Y" and "X" as the preceding amplitude value. That is, when the preceding amplitude value is "Y", the current amplitude value is "X", while when the preceding amplitude value is "X", the current one is "Y". To this relation between the preceding and current amplitude values, the decoding rule 5 or 6 applies (refer to FIG. 3). Therefore, the decoding portion 24 decodes the multilevel code string 6 between time $t_6$ and $t_7$ according to the above decoding rules and continues to reproduce COM 41 as the decode symbol. The decoding portion 24 outputs the reproduced COM 41 to the second output portion 26.

The decoding portion 24 detects "Y" as the current amplitude value immediately after time $t_7$ (refer to FIG. 2d). Further, since the second latching portion 23 latches the amplitude value "Y" outputted from the receiving portion 21 immediately before time $t_7$, the decoding portion 24 obtains the preceding amplitude value "Y" from the second latching portion 23 immediately after time $t_7$. To the relation in which the preceding amplitude value is "Y" and the current one is "Y", the decoding rule 8 applies. Therefore, the decoding portion 24 detects a change of the command symbol across time $t_7$. In the present embodiment, two command symbols COM 41 and COM 42 are assumed. Therefore, since COM 41 has been received before time $t_7$, the decoding portion 24 detects a change from COM 41 to COM 42 immediately after time $t_7$, and starts reproducing COM 42 as the decode symbol. Between time $t_7$ and $t_8$, as between time $t_6$ and $t_7$, when the preceding amplitude value is "Y", the current one is "X", and when the preceding amplitude value is "X"", the current one is "Y". Therefore, the decoding portion 24 continues to reproduce COM 42 as the decode symbol between time $t_7$ and $t_8$. The decoding portion 24 outputs the reproduced COM 42 to the second output portion 26.

The second latching portion 23 latches the preceding amplitude "Y" immediately after time $t_8$. At the same time, the decoding portion 24 detects the current amplitude value "Y" (refer to FIG. 2d). In this case, as is the same for time $t_7$, a change of command symbol across time $t_8$ is detected according to the decoding rule 8, thereby starting to reproduce COM 41 as the decode symbol. To the relation between the preceding and current amplitude values between time $t_8$ and $t_9$, the decoding rules 5 and 6 alternately apply, thereby continuing to reproduce COM 41 as the decode symbol continues to be reproduced between time $t_8$ and $t_9$. COM 41 is outputted to the second output portion 26.

The decoding portion 24 continues to detect "W" or "Z" as the current amplitude value between time $t_9$ and $t_{10}$ (refer to FIG. 2d). During this time period, the decoding portion 24 continues to reproduce "0" or "1" as the decode symbol according to the decoding rule 3 or 4 without obtaining the preceding amplitude value from the second latching portion 23. That is, DATA 43 is reproduced. The decoding portion 24 outputs the reproduced DATA 43 to the first output portion 25. In this way, the decoding portion 24 does not get a previous amplitude value from the second latching portion 23 as to DATA 43, and therefore can perform decoding and reproduction with light load compared with COM 41, etc. However, the amplitude value "W" or "Z" outputted from the receiving portion 21 is inputted to the second latching portion 23 also between time $t_9$ and $t_{10}$. Therefore, the second latching portion 23 latches "W" or "Z" as the preceding amplitude value immediately after time $t_{10}$. At the same time, the decoding portion 24 detects "Y" as the current amplitude value (refer to FIG. 2d). The relation between these amplitude values applies to the decoding rule 2 (refer to FIG. 3). Therefore, the decoding portion 24 starts reproducing COM 42 as the decode symbol immediately after time $t_{10}$.

FIG. 2d does not show a case in which the preceding amplitude value is "W" or "Z" and the current one is "X". The relation between these amplitude values applies to the decoding rule 1. As described above, the multilevel assigning portion 141 initially assigns the amplitude value "X" when a change from DATA 43 to COM 41 occurs, and therefore, the encoding rules and the decoding rules uniquely correspond to each other.

Furthermore, COM 41 is detected after time $t_{11}$ and decoding and reproduction is made in the same manner as described above. Therefore, its description is omitted.

As described above, in the present transmission method, the transmitting end 1 represents information to be transmitted to the receiving end 2 by the relation between the amplitude value of a transmitted multilevel code and the amplitude value of a multilevel code to be transmitted this time. That is, the transmitting end 1 can perform encoding if the relation between the previous and current amplitude values is known. On the other hand, the 4B5B encoding generates a transmission path code of five bits after waiting until the whole transmission information of four bits is inputted. In other words, in the 4B5B encoding, it is required to wait for future transmission information to be inputted. However, the transmitting end 1 of the present transmission method assigns the current amplitude value to perform encoding without waiting for future transmission information. Therefore, the transmitting end 1 can perform encoding faster than the 4B5B encoding and the like. Furthermore, the decoding portion 24 of the receiving end 2 decodes according to the relation between the amplitude value of a previously received multilevel code and the amplitude value of a multilevel code received this time. The receiving end 2 can also decode and reproduce the transmitted information if only knowing the relation between the previous and current information. On the other hand, in the 4B5B decoding, it is impossible to reproduce the information of four bits until the whole information of five bits is inputted. In other words, it is required to wait future transmission information to be inputted. However, the receiving end 2 does not have to wait for future transmission information, and therefore, can perform encoding faster than the 4B5B decoding and the like. This can provide a transmission method and a transmission device capable of transmitting information from the transmitting end 1 to the receiving end 2 with smaller transmission delay. Furthermore, in the transmission device, the encoding portion 14 generates the multilevel code string 6 with same codes not excessively successive. This multilevel code string allows DC balance in the transmission path 3, preventing scintillation of the average value of the signal at the transmitting end 1 and the receiving end 2.

In the present transmission method and transmission device, the information to be transmitted is represented by the relation between two amplitude values selected among multilevel values (that is, previous and current amplitude values). The considerable number of combinations of two amplitude values selected can be assumed due to the multilevel codes. That is, it is possible to generate the relations between two amplitude values (that is, combinations of two values) as many as the multilevel code values, in which successive same codes do not occur. These combinations can be assigned to a command and/or data. Therefore, the encoding portion 14 can easily convert the multiplexed signal string 5 in which the command and the data are multiplexed into the multilevel encoding string 6.

Encoding methods based on previous and current amplitude values include Non Return to Zero-Inverse (NRZ-I) encoding. In this NRZ-I encoding, a changing point from/to "0" to/from "1" is detected in an inputted binary data string, and when the changing point is detected, "1" is assigned, while "0" is assigned otherwise. However, in the NRZ-I encoding, when a changing point from "0" to "1" or vice versa does not exist, "0" is assigned for a long period of time. As a result, in the NRZ-I encoding, a code string with successive same codes is generated depending on the inputted binary data string. Therefore, DC balance is worsened in the transmission path, and transmission of correct information cannot be achieved.

As described above, in the present transmission method and transmission device, carrying information on previous and current amplitude values and multilevel transmission are combined to produce the above unique effects.

The present transmission method and the transmission device are not limited to quaternary transmission, and if only multilevel codes whose radix is not less than three are transmitted, the above effects can be obtained. As a second example, described next is a case of ternary transmission in the present transmission method and transmission device. Since the structure of the transmission device of the second example is the same as that of the first example, the following description refers to FIG. 1. The encoding rules of the encoding portion 14 and the decoding rules of the decoding portion 24 in the first example are different from those in the second example, which will be described below.

Figure 4:
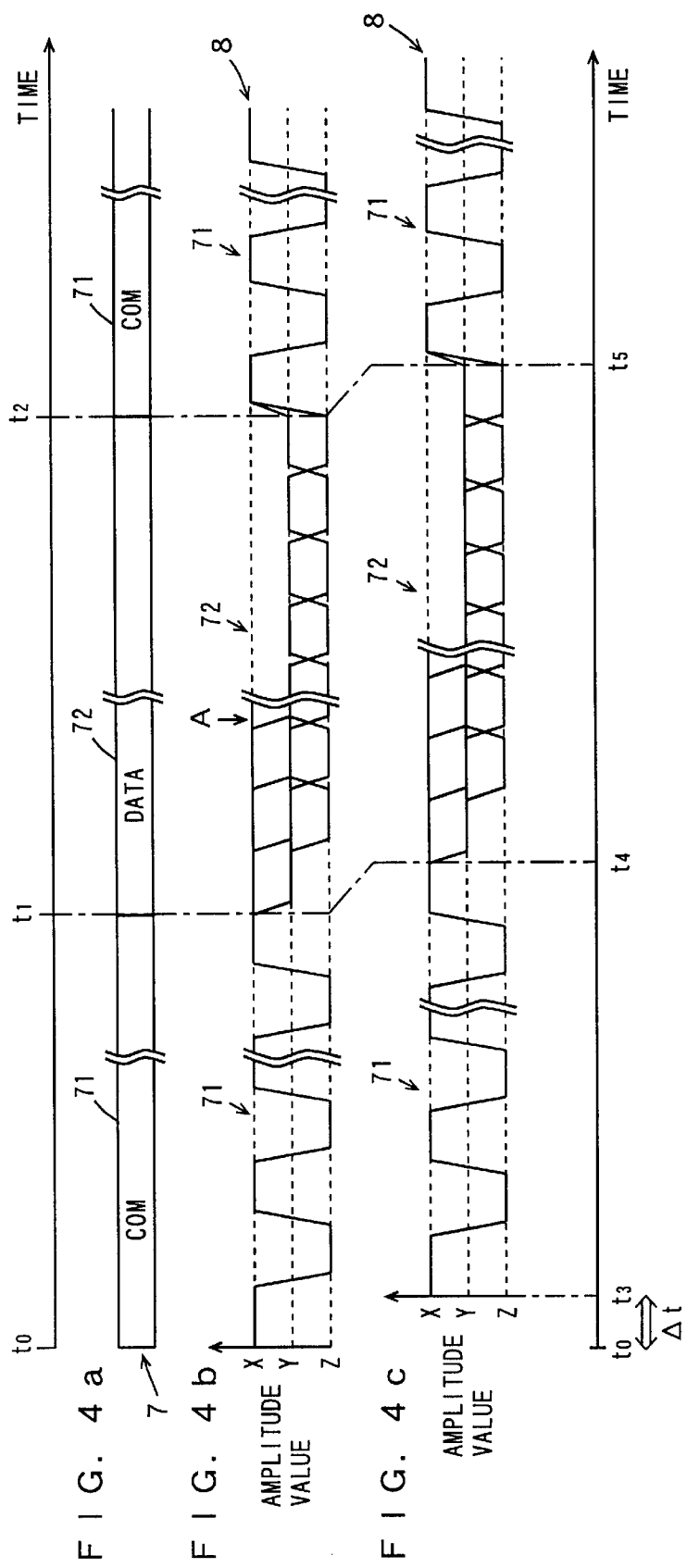
FIGS. 4a to 4c show examples of encoding rules in ternary transmission.

FIGS. 4a to 4c are diagrams for describing encoding rules of the second example. FIG. 4a shows a symbol string 7 outputted from the selector 13. In the symbol string 7, COM 71 as a command symbol and DATA 72 as a data string are multiplexed. The symbol string 7 includes COM 71 between time $t_0$ and $t_1$, and time $t_2$ and $t_3$; and DATA 72 between time $t_1$ and $t_3$. The selector 13 outputs a multiplexed signal string as an example of the symbol string 7 of FIG. 4a. However, in order to simplify the description, assume that this multiplexed signal string is the same as that in the first example (refer to FIG. 2b), and its illustration and detailed description are omitted.

FIG. 4b shows a time waveform of a multilevel code string 8 outputted from the encoding portion 14 in response to the multiplexed signal string (refer to a solid line in the drawing). In the multilevel code string 8, COM 71 and DATA 72 are represented by three amplitude values. In the present example, "X"", "Y" and "Z" (where X>Y>Z) are used as three amplitude values.

When the multiplexed signal string is generated in the same manner as in the first example, COM 71 has successive same codes the time of being inputted to the encoding portion 14 COM 71 is represented by a change from the amplitude value "Y" or "Z" to "X". COM 71 is also represented by a change from the amplitude value "X" to "Z". Thus, in the multilevel code string 8, COM 71 is represented in principle by alternation of "X" and "Z", and thereby the multilevel code string 8 with same codes not exceedingly successive can be generated.

Further, the symbol of DATA 72 is "0" or "1". In the second example, a change from "X" to "Y", a change from "Y" to "Z" or a change from "Z" to "Y" is assigned to "1". That is, different amplitude values are assigned to "1" according to the amplitude value assigned immediately before. A change from "X" to "X", a change from "Y" to "Y" or a change from "Z" to "Z" is assigned to "0". That is, the same amplitude value as the preceding one is assigned to "0".

Described next is detailed operation of the encoding portion 14 of the second example referring to FIG. 1 and FIGS. 4a to 4c. The symbol string 7 of FIG. 4a outputted from the selector 13 is inputted to the multilevel assigning portion 141. COM 71 is inputted to the multilevel assigning portion 141 between time $t_0$ and $t_1$. When the multilevel assigning portion 141 detects COM 71 and the first latching portion 15 latches "Z" as the preceding amplitude value, the multilevel assigning portion 141 assigns "X" as the current amplitude value. "X" is outputted to the first latching portion 15 and the multilevel code string generating portion 142. Furthermore, when the preceding amplitude value is "X", the amplitude value "Z" is assigned as the current amplitude. "Z" is outputted to the first latching portion 15 and the multilevel code string generating portion 142. As a result, the multilevel code string generating portion 142 generates a multilevel code string 8 composed of alternation of "X" and "Z" as COM 71 between t0 and $t_1$.

The multilevel assigning portion 141 detects "0" or "1" (DATA 72) from the inputted symbol string 7 immediately after time $t_1$. At this time, "X" or "Z" is latched in the first latching portion 15 as the preceding amplitude value. Assume that, as shown in FIG. 4b, "X" is assigned immediately before time $t_1$. In this case, when detecting "0" immediately after time $t_1$, the multilevel assigning portion 141 assigns the preceding amplitude value "X" as the current amplitude value. On the other hand, when "X" is assigned immediately before time $t_1$ and "1" is detected immediately after time $t_1$, the multilevel assigning portion 141 assigns "Y" as the current amplitude value. "1" is thus represented as a change from the amplitude value "X" to "Y", as described above. The multilevel assigning portion 141 assigns "X" or "Y" as the current amplitude value immediately after time $t_1$ and outputs to the multilevel code string generating portion 142 and the first latching portion 15.

The multilevel assigning portion 141 assigns the amplitude values to the inputted DATA 72 between time $t_1$ and $t_2$ according to the above described encoding rules. Assuming that "0" is continuously detected from time $t_1$, the multilevel assigning portion 141 continues to assign "X" latched immediately before time $t_1$ in the first latching portion 15. The multilevel assigning portion 141 assigns the amplitude value "Y" at the time of a change from "0" to "1". According to the above encoding rules, between time $t_1$ and $t_2$, the multilevel assigning portion 141 assigns "Y" or "Z" according to "0" or "1" detected after initially assigning "Y". As a result, as shown in FIG. 4b, the multilevel code string generating portion 142 generates the multilevel code string 8 composed of the amplitude values "X" between time $t_1$ and $t_2$ until detecting "1". Furthermore, the multilevel code string generating portion 142 detects "1" (refer to a time point indicated by an arrow A) and then generates the multilevel code string 8 represented by a sequence of the amplitude values "Y" and "Z" until time $t_2$.

The multilevel assigning portion 141 detects COM 71 after time $t_2$. The first latching portion 15 latches "Y" or "Z" as the preceding amplitude value immediately before time $t_2$. The multilevel assigning portion 141 assigns "X" to the detected COM 71 as the current amplitude value regardless of the latched amplitude value. A change from DATA 72 to COM 71 is thus represented by a transition from "Y" or "Z" to "X"". After that, the multilevel assigning portion 141 alternately assigns "Z" or "X" during detecting COM 71. As a result, the multilevel code string generating portion 142 generates the multilevel code string 8 composed of alternation of the amplitude values "X" and "Z" after time $t_2$.

In the example of FIG. 4b, "Y" or "Z" is latched in the first latching portion 15 as the preceding amplitude value immediately before time $t_2$. However, DATA 72 can be assumed to be composed of only "0"s between time $t_1$ and $t_2$. Therefore, the first latching portion 15 may latch "X" as the preceding amplitude value immediately before time $t_2$. In this case "Z" is assigned to COM 71 detected immediately after time $t_2$. After that, as described above, "X" and "Z" are alternately assigned to the detected COM 71. Therefore, even when "X" is latched as the preceding amplitude value immediately before time $t_2$, the multilevel code string 8 composed of alternation of the amplitude values "X" and "Z" is generated.

FIG. 5 shows an example of the decoding rules of the present example. The decoding rules of FIG. 5 list preceding and current amplitude values and decode symbols. The decoding rules are now specifically described referring to FIG. 5 from above. FIG. 5 shows an example of decoding rules previously set in the decoding portion 24 in ternary transmission. The decoding rules of FIG. 5 list the relations between preceding and current amplitude values and decode symbols. Described specifically below are the decoding rules 1 to 5.

1. When the preceding amplitude value is "X" and the current amplitude is "Z", COM 71 is received.

2. When the preceding amplitude value is "Y" or "Z" and the current one is "X", COM 71 is received.

3. When the preceding amplitude value is "X" or "Z" and the current one is "Y", the signal level "1" of DATA 72 is received.

4. When the preceding amplitude value is "Y" and the current one is "Z", "1" of DATA 72 is received.

5. When both of the preceding and current amplitude values are "X", "Y" or "Z", "0" of DATA 72 is received.

Described below is detailed operation of the decoding portion 24 of the present example referring to FIG. 1, FIGS. 4a to 4c and FIG. 5. Since the operation of the components other than the decoding portion 24 at the receiving end 2 has been already described, its description is omitted herein. FIG. 4c shows a time waveform of the multilevel code string 8 inputted to the decoding portion 24. The multilevel code string 8 of FIG. 4*c* is different as compared with that of FIG. 4*b* in that transmission delay Δt due to the transmission path 3 occurs.

When the multilevel code string 8 is inputted, the decoding portion 24 periodically detects its amplitude value. The second latching portion 23 latches the amplitude value of each multilevel code which constructs the multilevel code string 8 outputted from the receiving portion 21. The decoding portion 24 obtains the preceding amplitude value from the second latching portion 23 every time it detects an amplitude value.

The decoding portion 24 alternately detects "X" and "Z" as the current amplitude value between time $t_3$ and $t_4$ (refer to FIG. 4*c*) and alternately obtains "Z" and "X" as the preceding one. That is, when the preceding amplitude value is "Z", the current one is "X"", and when the preceding amplitude value is "X", the current one is "Z". To this relation between the preceding and current amplitude values, the decoding rule 1 or 2 (refer to FIG. 5) applies. Therefore, when decoding the multilevel code string 8 between time $t_3$ and $t_4$, the decoding portion 24 continues to reproduce COM 71 as the decode symbol.

The amplitude value "X" is latched in the second latching portion 23 at time $t_4$. The decoding portion 24 detects "X" or "Y" as the current amplitude value immediately after time $t_4$ (refer to FIG. 4*c*). The decoding portion 24 obtains "X" as the preceding amplitude value. The relation in which the preceding and current amplitude values are "X" applies to the decoding rule 5 in FIG. 5. In this case, the decoding portion 24 detects at time $t_4$ that DATA 72 is started to be received, and further reproduces "0" as the decode symbol. To the relation in which the preceding amplitude value is "X" and the current one is "Y", the decoding rule 3 in FIG. 5 applies. In this case, the decoding portion 24 detects a start of receiving DATA 72 and further reproduces "1" as the decode symbol. The relation between the preceding and current amplitude values between time $t_4$ and $t_5$ applies to any of the rules 3 to 5 in FIG. 5, and therefore, the decoding portion 24 reproduces "0" or "1" as the decode symbol.

The amplitude value "Y" or "Z" is latched in the second latching portion 23 at time $t_5$. The decoding portion 24 detects "X" as the current amplitude value immediately after time $t_4$ (refer to FIG. 4*c*). The decoding portion 24 obtains either "Y" or "Z" as the preceding amplitude value. To the relation in which the preceding amplitude value is "Y" or "Z" and the current one is "X", the decoding rule 2 in FIG. 5 applies. In this case, the decoding portion 24 starts reproducing COM 71 as the decode symbol at time $t_5$. After time $t_5$, to the relation between the preceding and current amplitude values, either the decoding rule 1 or 2 in FIG. 5 applies as described above, and therefore, the decoding portion 24 reproduces COM 71 as the decode symbol.

In the example shown in FIG. 4*c*, the second latching portion 15 latches "Y" or "Z" as the preceding amplitude value immediately before time $t_5$. However, it can be assumed that DATA 72 is composed of only "0"s between time $t_4$ and $t_5$. In this case, "X" may be latched as the preceding amplitude value at time $t_2$, and the decoding portion 24 detects the amplitude value "Z" immediately after time $t_2$. To the relation in which the preceding amplitude value is "X" and the current one is "Z", the decoding rule 1 in FIG. 5 applies. Therefore, the decoding portion 24 reproduces COM 71 as the decode symbol.

As described above, even in ternary transmission, the transmitting end 1 represents transmission information to the receiving end 2 by the relation between the amplitude value of a transmitted multilevel code and the amplitude value of the multilevel code to be transmitted this time, thereby allowing the transmitting end 1 to perform high-speed encoding, as described above. Further, the decoding portion 24 of the receiving end 2 decodes according to the relation between the amplitude value of a received multilevel code and the amplitude value of the multilevel code received this time, thereby allowing the receiving end 2 to perform high-speed decoding. This can provide a transmission method and a transmission device capable of transmitting information from the transmitting end 1 to the receiving end 2 with smaller transmission delay. The encoding portion 14 generates the multilevel code string 8 with same codes not excessively successive. The multilevel code string allows DC balance in the transmission path 3, thereby preventing scintillation of the average value of the signal at the transmitting end 1 and the receiving end 2. Further, even in ternary transmission, the transmitting end 1 can transmit the multilevel code string 8 in which a command and data are multiplexed. As described above, in the transmission method and transmission device of the present embodiment, unique effects occur by combining carrying information on previous and current amplitude values and multilevel transmission.

The concept of the present embodiment is not limited to ternary and quaternary transmission and can be applied to a method and a device for transmitting a multilevel code whose radix is not less than three. The radix of the multilevel code is appropriately set depending on the number of commands to be transmitted and the like.

Further, in the present embodiment, the data string is originally represented by "0" and "1", and therefore, "Z" is simply assigned to "0" and "W" is simply assigned to "1", assuming that same codes do not exist. However, this assignment is a preferred embodiment only, and a change of two different amplitude values may be assigned to "0" and "1".

(Second Embodiment)

In the first embodiment, the receiving end 2 shown in FIG. 1 is provided with a normalizing portion 22 for normalizing the receive signal level of the receiving portion 21. However, when the receiving portion 21 continuously receives intermediate amplitude values (in the example of FIGS. 2*a* to 2*d*, "X" and "Y" are intermediate amplitude values) for a long period of time, the normalizing portion 22 cannot normalize the receive signal level of the receiving portion 21. This is because the normalizing portion 22 defines the intermediate amplitude values based on the maximum and minimum amplitude values of the multilevel code inputted from the receiving portion 21. That is, when the intermediate amplitude values continue for a long period of time, the receiving portion 21 cannot find the maximum or minimum amplitude value and cannot amplify the received multilevel code string 6 or 8 at correct amplitude values. Therefore, a transmission method according to a second embodiment is effective. The structure of the transmission device of the second embodiment is the same as that of FIG. 1, and therefore, its description is omitted and FIG. 1 is referred for the following description. The second embodiment is different from the first one in the encoding rules and the decoding rules of the encoding portion 14 and the decoding portion 24, which will be described below.

Figure 6:
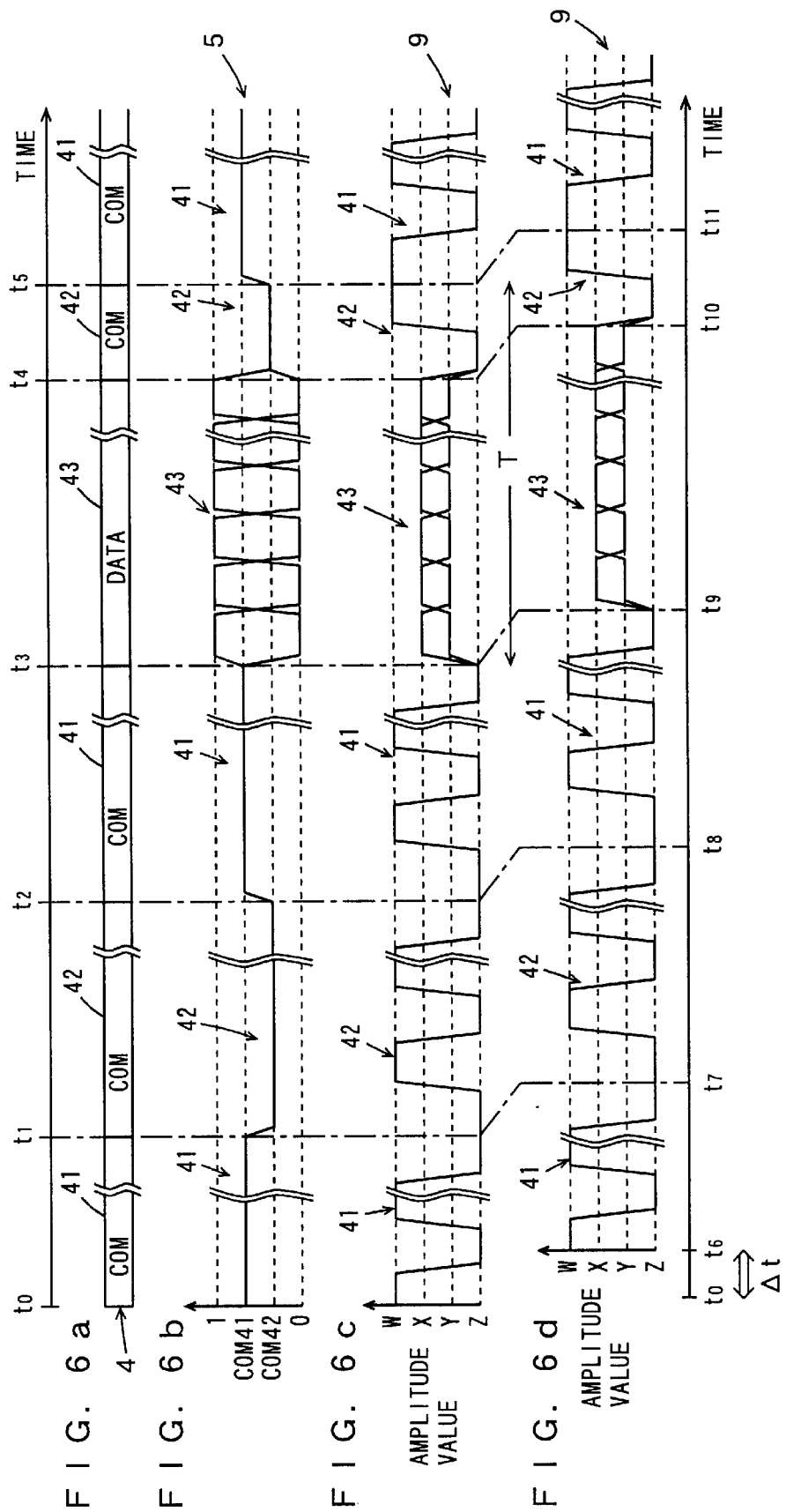
FIGS. 6a to 6d show an example of an encoding method in a transmission method of a second embodiment.

Described next is the second embodiment in quaternary transmission, as an example. FIGS. 6*a* to 6*d* are diagrams for describing the encoding rules of the transmitting end 1 of FIG. 1. Specifically, FIGS. 6*a* and 6*b* are the same as FIGS. 2*a* and 2*b*, respectively, and thus their description is omitted. FIG. 6*c* shows a time waveform (refer to a solid line in the drawing) of a multilevel code string 9 outputted from the encoding portion 14 when the multiplexed signal string 5 of FIG. 6b is inputted to the encoding portion 14. Also in FIG. 6c, four amplitude values "W", "X", "Y" and "Z" (where W>X>Y>Z) are used.

As shown in FIG. 6c, in the multilevel code string 9, COM 41 and COM 42 are represented by a maximum amplitude value "W" and a minimum amplitude value "Z", and DATA 43 is represented by intermediate amplitude values "X" and "Y". The multilevel code string 6 of FIG. 2c has an opposite relation to the multilevel code string 9, and in this point, the multilevel code string 9 is different from the multilevel code string 6. Other than that, the multilevel code string 9 is the same as the multilevel code string 6. A transition from "X" or "Y" to "W" is defined as a transition from DATA 43 to COM 41. A transition from "X" or "Y" to "Z" is defined as a transition from DATA 43 to COM 42.

COM 41 and COM 42 are generated at least once during a predetermined period T. This period is determined based on a time constant of the normalizing portion 22 such as AGC and ATC.

Described next is the detailed operation of the transmitting end 1 referring to FIGS. 6a to 6d. The multiplexed signal string 5 shown in FIG. 6b is transmitted from the selector 13 to the multilevel assigning portion 141 of the encoding portion 14. The multilevel assigning portion 141 alternately assigns "W" and "Z" to COM 41 detected between time $t_0$ and $t_1$ referring to the preceding amplitude value latched in the first latching portion 15 according to the encoding rules. As a result, the multilevel code string generating portion 142 generates the multilevel code string 9 composed of the alternation of the amplitude values "W" and "Z" between time $t_0$ and $t_1$.

The multilevel assigning portion 141 detects COM 42 immediately after time $t_1$. At this time, when the first latching portion 15 latches "Z" as the preceding amplitude value, the multilevel assigning portion 141 automatically assigns "Z" to the detected COM 42. As a result, the multilevel code string generating portion 142 generates the multilevel code string 9 in which "Z" repeats twice across time $t_1$.

The multilevel assigning portion 141 detects COM 42 between time $t_1$ and $t_2$, and thus alternately assigns "Z" and "W" referring to the preceding amplitude value. As a result, the multilevel code string 9 including alternation of "Z" and "W" included is generated between time $t_1$ and $t_2$. The multilevel assigning portion 141 detects COM 41 between time $t_2$ and $t_3$, and therefore, the amplitude values are assigned in the above described manner to generate the multilevel code string 9. As a result, the multilevel code string 9 with alternation of "Z" and "W" included is generated between time $t_2$ and $t_3$.

The multilevel assigning portion 141 assigns the amplitude value "X" or "Y" to "1" or "0" detected immediately after time $t_3$ referring to the preceding amplitude value. Generated thereafter is the multilevel code string 9 represented by a sequence of "X" and "Y" between time $t_3$ and $t_4$ during which DATA 43 is inputted.

The multilevel assigning portion 141 detects COM 42 immediately after time $t_4$. At this time, the first latching portion 15 latches "X" or "Y" as the preceding amplitude value. By the preceding amplitude value being "X" or "Y" and detection of COM 42, the multilevel assigning portion 141 knows that a change has been made from DATA 43 to COM 42. In this case, the multilevel assigning portion 141 initially assigns the amplitude value "Z" to the detected COM 42. As a result, a transition of the amplitude value occurs from "X" or "Y" to "Z" across time $t_4$, thereby representing a change from DATA 43 to COM 42. After the initial amplitude value "Z" is assigned and until time $t_5$, "W" and "Z" are alternately assigned according to the above described encoding rules. After that, the encoding portion 14 assigns the amplitude value to the detected symbol according to the above encoding rules. As a result, the multilevel code string 9 of FIG. 6c is generated by the multilevel code string generating portion 142 and transmitted to the transmitting portion 16. The transmitting portion 16 outputs the inputted multilevel code string 9 to the transmission path 3.

FIG. 7 shows decoding rules previously set in the decoding portion 24 of the present embodiment. The decoding rules of FIG. 7 list the preceding and current amplitude values and the decode symbols. The decoding rules are now specifically described referring to FIG. 7:

1. When the preceding amplitude value is "X" or "Y" and the current amplitude value is "W", COM 41 is received.
2. When the preceding amplitude value is "X" or "Y" and the current one is "Z", COM 42 is received.
3. When the current amplitude value is "X", "1" of the DATA 43 is received.
4. When the current amplitude value is "Y", the decode symbol represents that "0" of the DATA 43 is received.
5. When the preceding amplitude value is "W" and the current one is "Z", the decode symbol is the same as the preceding decode symbol.
6. When the preceding amplitude value is "Z" and the current one is "W", the decode symbol is the same as the preceding one.
7. When both of the preceding and current amplitude values are "W", the command symbol is changed from COM 41 to COM 42 or from COM 42 to COM 41.
8. Also, when both of the preceding and current amplitude values are "Z", the command symbol is changed, as described above.

Described next is the operation of the decoding portion 24 referring to FIGS. 6a to 6d and FIG. 7. The multilevel code string 9 is received by the receiving portion 21, normalized by the normalizing portion 22, and then inputted to the decoding portion 24 and the second latching portion 23. In FIG. 6d, Δt represents delay time required for transmission. The second latching portion 23 latches the same amplitude value as detected immediately before by the decoding portion 24. The decoding portion 24 obtains the preceding amplitude value from the second latching portion 23 every time it detects the amplitude value of the inputted multilevel code string 9 to decode and reproduce the multilevel code string 9 according to the decoding rules of FIG. 7. Decoding and reproducing processing is the same as in the first embodiment, and thus its description is omitted here.

In the second embodiment, an important point is that since COM 41 or COM 42 arrives at the receiving portion 21 at least once during a predetermined time period T, the normalizing portion 22 receives the maximum amplitude value "W" and the minimum amplitude value "Z" at least once during the predetermined time period T (that is, time constant of the normalizing portion 22). Therefore, the normalizing portion 22 can correctly normalize the multilevel code string with the receive signal of the maximum amplitude value "W" and the minimum amplitude value "Z". Thus, the multilevel code string 9 including the amplitude values "W", "X", "Y" and "Z" assigned at the transmitting end 1 is inputted to the back end of the decoding portion and the second latching portion 23.

(Third Embodiment)

In the above first and second embodiments, fixed encoding rules and decoding rules are set in the transmission device. However, it is assumed that the transmission device can be set in various environments. Furthermore, the surrounding environment of the transmission device may not be constant, but may change with respect to time. Under such an environment, it can be assumed that the multilevel code string 6 or 8 which the transmitting end 1 in the transmission device transmits may be DC balanced during some time, but may not be during other times. It can also be assumed that the multilevel code string 6 or 8 may be DC balanced in a place, but may not be in other places. Therefore, a transmission device according to a third embodiment is effective in order to always keep DC balance of the multilevel code string 6 or 8. Since the structure of the transmission device according to the third embodiment is the same as that in FIG. 1, its illustration is omitted and FIG. 1 is referred for the description below. The third embodiment is different from the other embodiments in that the encoding rules and the decoding rules of the encoding portion 14 and the decoding portion 24 are changed as required. Therefore, a plurality of sets of encoding rules and decoding rules have to be set in the transmission device. Described below is a specific example in which first and second encoding rules are set in the encoding portion 14 and first and second decoding rules are set in the decoding portion 24. Furthermore, quaternary transmission is assumed in the following example. FIGS. 8a to 8c are diagrams for describing the first and second encoding rules of the transmitting end 1. FIG. 8a shows a symbol string 17 outputted form the selector 13. In the symbol string 17, COM 171 and COM 172 as command symbols and DATA 173 as a data string are multiplexed. The symbol string 17 includes COM 171 between time $t_0$ and $t_1$, time $t_2$ and $t_3$, time $t_4$ and $t_5$, and time $t_6$ and $t_7$; COM 172 between time $t_3$ and $t_4$, and time $t_7$, and $t_8$; and DATA 173 between time $t_1$ and $t_2$, and time $t_5$ and $t_6$. The selector 13 outputs a multiplexed signal string representing the symbol string 17 of FIG. 8a. For the purpose of simplifying description, it is assumed that the multiplexed signal string is the same as that in the first embodiment (refer to FIG. 2b), and thus neither illustrated nor described in detail here. FIG. 8b shows a time waveform (refer to a solid line in the drawing) of a multilevel code string 18 outputted from the encoding portion 14 when a symbol string 17 of FIG. 8a is inputted to the encoding portion 14. Also in the third embodiment, "W", "X"", "Y" and "Z" (where W>X>Y>X>Z ) are used as four amplitude values.

As shown in FIG. 8b, in the third embodiment, the symbol string 17 is encoded into the multilevel code string 18 according to the first encoding rules during a time period $T_1$ (between time $t_0$ and $t_4$, and time $t_8$ and thereafter). In the first encoding rules, COM 171 and COM 172 are represented by alternation of "W" and "Z". Further, a change from COM 171 to COM 172 is represented by two successive multilevel codes of the same amplitude value. Since these points are the same as those in the first embodiment, their detailed description is omitted here. "1" and "0" of the DATA 173 are represented by "X" and "Y", respectively. A transition from DATA 173 to COM 171 is represented by a change from "X" or "Y" to "W", and a transition form DATA 173 to COM 172 is represent by a change from "X" or "Y" to "Z".

According to the second encoding rules, the symbol string 17 is encoded into the multilevel code string 18 during a time period $T_2$ (between time $t_4$ and $t_8$). In the second encoding rules, COM 171 and COM 172 are represented by an alternation of "X"" and "Z" and a transition from COM 171 to COM 172 is represented by two successive multilevel codes of the same amplitude value, which is the same as in the first encoding rules. "1" and "0" of DATA 173 are represented by "W" and "Y", respectively. A transition from DATA 173 to COM 171 is represented by a change from "W" or "Y" to "X", and a transition from DATA 173 to COM 172 is represented by a change from "W" or "Y" to "Z".

Although a plurality of COMs 171 are multiplexed in the symbol string 17 of FIG. 8a, their signal formats are originally the same. Each COM 172 has the same signal format and each DATA 173 has the same signal format. However, since the first and second encoding rules are used during time periods $T_1$ and $T_2$, respectively, the signal format of COM 171 during time period $T_1$ differs from that during time period $T_2$ in the multilevel code string 18 of FIG. 8b. This also goes for each COM 172 and each DATA 173. In order to clarify the difference, in FIG. 8b, COM 171 encoded during time period $T_1$ is represented by a reference numeral "171'" and COM 171 encoded during time period $T_2$ is represented as a reference numeral "171"". Similarly, for the purpose of discrimination, reference numerals "172'" and "172"" are provided for COM 172 during time period $T_1$ and COM 172 during time period $T_2$, respectively, and reference numerals "173'" and "173"" are provided for DATA 173 during time period $T_1$ and DATA 173 during time period $T_2$, respectively.

In the third embodiment, it is required to predetermine how to assign the amplitude value immediately after switching between these encoding rules. In the third embodiment, it is defined that "W" is assigned when COM 171 is detected and "Z" is assigned when COM 172 is detected immediately after the first encoding rules are switched to the second encoding rules. It is also defined that "X" is assigned when COM 171 is detected and "Z" is assigned when COM 172 is detected immediately after the second encoding rules are switched to the first encoding rules.

The transmitting end 1 has to notify the receiving end 2 that the switching of the encoding rules has been done and the timing of the switching. Therefore, in the third embodiment, the encoding portion 14 receives input of COM 172 from the selector 13, counts four multilevel codes and then switches the encoding rules. The decoding portion 24 receives input of COM 172, counts four multilevel codes and then switches the decoding rules. This allows synchronization of the encoding and decoding rules between the encoding portion 14 and the decoding portion 24. That is, when the encoding portion 14 encodes with the first encoding rules, the decoding portion 24 can decode with the corresponding first decoding rules. When the encoding portion 14 encodes with the second encoding rules, the decoding portion 24 can decode with the corresponding second decoding rules.

Described next is detailed operation of the transmitting end 1 referring to FIG. 1 and FIGS. 8a to 8c. The selector 13 outputs the symbol string 17 shown in FIG. 8a to the multilevel assigning portion 141 of the encoding portion 14.

COM 171 is periodically detected between time $t_0$ and $t_1$. The multilevel assigning portion 141 therefore alternately assigns the amplitude values "W" and "Z" during this time period according to the first encoding rules, and as a result, the multilevel code string generating portion 142 generates the multilevel code string 18 representing COM 171' by alternation of "W" and "Z".

The multilevel assigning portion 141 detects that the inputted symbol string 17 is changed to DATA 173 immediately after time $t_1$. At this time, the first latching portion 15 latches "W" or "Z" as the preceding amplitude value. Regardless of the amplitude value, the multilevel assigning portion 141 assigns "X" as the current amplitude value when detecting "1" and assigns "Y" when detecting "0". From then on, the encoding portion 14 generates the multilevel code string 18 representing DATA 173 by a sequence of "X" and "Y" between time $t_1$ and $t_2$ during which DATA 173 is inputted.

COM 171 is periodically detected between time $t_2$ and $t_3$. Therefore, during this time period, as between time $t_0$ and $t_1$, the encoding portion 14 generates the multilevel code string 18 representing COM 171' by alternation of the amplitude values "W" and "Z", provided that "W" is assigned immediately after time $t_2$. A change from DATA 173 to COM 171 is thus represented as a change from "X" or "Y" to "W", as described above. As a result, the multilevel code string generating portion 142 generates the multilevel code string 18 representing COM 171' by alternation of "W" and "Z".

The multilevel assigning portion 141 detects COM 172 from the inputted symbol string 17 immediately after time $t_3$. At this time, the first latching portion 15 latches the amplitude value "W" or "Z" ("Z" in FIG. 8b) assigned immediately before time $t_3$. In this case, the multilevel assigning portion 141 assigns the preceding amplitude "W" or "Z" to the detected COM 172. This represents a transition from COM 171 to COM 172. The multilevel assigning portion 141 also increments a counter (not shown) whose initial value is "0" by "1" every time it assigns the amplitude value to the detected COM 172. After time $t_3$, the multilevel assigning portion 141 continues to assign the amplitude value according to the above described first encoding rules. "W" and "Z" are alternately assigned between time $t_3$ and $t_4$ during which COM 172 is detected. The value of the counter is incremented by "1" every time either amplitude value is assigned. Consequently, the multilevel code string generating portion 142 generates the multilevel code string 18 representing COM 172' as its amplitude value immediately after time $t_3$ is "Z" and the other amplitude values thereafter are alternating "W" and "Z".

When the counter shows "4", the multilevel assigning portion 141 knows the timing for switching the encoding rules, ending the use of the first encoding rules and the starting the use of the second encoding rules.

COM 171 is periodically detected between time $t_4$ and $t_5$. Therefore, during this time period, the multilevel assigning portion 141 alternately assigns the amplitude values "X" and "Z" according to the second encoding rules, provided that "X" is assigned immediately after the first encoding rules is switched to the second encoding rules. As a result, during this time period, the multilevel code string generating portion 142 generates the multilevel code string 18 representing COM 171" as its amplitude value immediately after time $t_4$ is "X" and the other amplitude values thereafter are alternating "Z" and "X".

The multilevel assigning portion 141 detects a change of the inputted symbol string 17 to DATA 173 immediately after time $t_5$. At this time, the first latching portion 15 latches "X" or "Z" as the preceding amplitude value. Regardless of the preceding amplitude value, the multilevel assigning portion 141 assigns "W" as the current amplitude value when detecting "1" and assigns "Y" when detecting "0". From then on, the encoding portion 14 generates the multilevel code string 18 representing DATA 173" by a sequence of "W" and "Y" between time $t_5$ and $t_6$ during which DATA 173 is inputted.

COM 171 is periodically detected between time $t_6$ and $t_7$. During this time period, as between time $t_4$ and $t_5$, the multilevel code string 18 representing COM 171" by alternation of "X" and "Z" is generated, provided that the amplitude value immediately after $t_6$ is "X".

The multilevel assigning portion 141 detects COM 172 immediately after time $t_7$. At this time, the multilevel assigning portion 141 automatically assigns the amplitude value "X" or "Z" ("Z" in FIG. 8b) assigned immediately before time $t_7$ as the current amplitude value. Further, the detection of COM 172 causes the multilevel assigning portion 141 to start counting, as described above. Between $t_7$ and $t_8$ during which COM 172 is detected, the counter value is incremented by "1" every time "X" or "Z" is assigned.

Therefore, the multilevel code string 18 generated during this time period represents COM 171" as the amplitude value immediately after time t, is "Z" and the other amplitude values thereafter are alternating "X" and "Z". When the counter shows "4", the multilevel assigning portion 141 knows the timing for switching the encoding rules, ending the use of the second encoding rules and starting the use of the first encoding rules.

The encoding portion 141 thereafter repeats the above described series of operations, generating the multilevel code string 18 obtained by encoding the inputted symbol string 17 according to the first or second encoding rules. The multilevel code string 18 is transmitted to the transmission path 3 by the transmitting portion 16.

FIGS. 9a and 9b shows decoding rules previously set in the decoding portion 24 of the present embodiment. FIGS. 9a and 9b list the preceding and current amplitude values and the decode symbols. Specifically, FIG. 9a shows first decoding rules defined corresponding to the above first encoding rules. FIG. 9b shows second decoding rules defined corresponding to the above second encoding rules. Specifically described first are the first decoding rules referring to FIG. 9a from above:

1. When the preceding amplitude value is "X" or "Y" and the current amplitude value is "W", COM 171 is received.

Further, immediately after the decoding rules are switched and when the current amplitude value is "W", COM 171 is received.

2. When the preceding amplitude value is "X" or "Y" and the current one is "Z", COM 172 is received. In addition, when four multilevel codes of COM 172 are received, the decoding rules are switched.

Further, immediately after the decoding rules are switched and when the current amplitude value is "Z", COM 172 is received. In addition, when four multilevel codes of COM 172 are received, the decoding rules are switched.

3. When the current amplitude value is "X", "1" of DATA 173 is received.

4. When the current amplitude value is "Y", "0" of DATA 173 is received.

5. When the preceding amplitude value is "W" and the current one is "Z", the decode symbol is the same as the preceding decode symbol.

6. When the preceding amplitude value is "Z" and the current one is "W", the decode symbol is the same as the preceding decode symbol.

7. When both of the preceding and current amplitude values are "W", the command symbol is changed from COM 171 to COM 172 or from COM 172 to COM 171.

8. Also when both of the preceding and current amplitude values are "Z", the command symbol is changed, as described above.

Specifically described next are the second decoding rules referring to FIG. 9b from above:

1. When the preceding amplitude value is "W" or "Y" and the current amplitude value is "X", COM 171, is received. Further, immediately after the decoding rules are switched and when the current amplitude value is "X", COM 171' is received.

2. When the preceding amplitude value is "W" or "Y" and the current one is "Z", COM 172' is received. In addition, when four multilevel codes of COM 172' are received, the decoding rules are switched.

Further, immediately after the decoding rules are changed and when the current amplitude value is "Z", COM 172' is received.

In addition, when four multilevel codes of COM 172' are received, the decoding rules are switched.

3. When the current amplitude value is "W", "1" of DATA 173' is received.

4. When the current amplitude value is "Y", "0" of DATA 173' is received.

5. When the preceding amplitude value is "X" and the current one is "Z", the decode symbol is the same as the preceding decode symbol.

6. When the preceding amplitude value is "Z" and the current one is "X", the decode symbol is the same as the preceding decode symbol.

7. When both of the preceding and current amplitude values are "X", the command symbol is changed from COM 171' to COM 172' or from COM 172' to COM 171'.

8. Also when both of the preceding and current amplitude values are "Z", the command symbol is changed, as described above.

Described next is the detailed operation of the decoding portion 24 referring to FIGS. 8a to 8c and FIGS. 9a and 9b.

The multilevel code string 18 encoded with different rules during time period $T_1$ and time period $T_2$ (refer to FIG. 8c) is inputted through the receiving portion 21 to the decoding portion 24 and the second latching portion 23. This multilevel code string 18 is delayed by delay Δt due to the transmission path 3, as in the other embodiments. The second latching portion 23 latches the same amplitude value as the preceding one detected by the decoding portion 24. The decoding portion 24 obtains the preceding amplitude from the second latching portion 23 every time it detects the amplitude value of the inputted multilevel code string 18, and decodes and reproduces the multilevel code string 18 according to the decoding rules of FIGS. 9a and 9b. Since its decoding and reproducing method is the same as that in the first embodiment, its description is simplified herein.

An important point in the third embodiment is that, in the multilevel code string 18, the decoding portion 24 decodes part of the signal format which complies with the first encoding rules (part of time period $T_1$) according to the first decoding rules, and decodes part of the signal format which complies with the second encoding rules (part of time period $T_2$) according to the second decoding rules.

Between $t_9$ and $t_{12}$, the decoding portion 24 decodes COM 171', DATA 173' and COM 171' included in the multilevel code string 18 according to the first decoding rules (refer to FIG. 9a) referring to the preceding amplitude value latched in the second latching portion 23, and reproduces COM 171, DATA 173 and COM 171.

The decoding portion 24 detects that the amplitude value "Z" of the inputted multilevel code string 18 repeats twice across $t_{12}$. The decoding portion 24 detects a change from COM 171 to COM 172 according to the first decoding rule 8 and starts reproducing COM 172. This start of reproducing COM 172 causes the decoding portion 24 to increment the counter (not shown) whose initial value is "0" by "1". The decoding portion 24 alternately detects "Z" and "W" as the current amplitude value between $t_{12}$ and $t_{13}$ and decodes COM 172' composed of four multilevel codes referring to the preceding amplitude value "W" or "Z" to continue to reproduce COM 172. The decoding portion 24 further increments the counter value by "1" every time it detects the current amplitude value "Z" or "W". Therefore, the decoding portion 24 knows that the counter shows "4" when four multilevel codes structuring COM 172' have been reproduced. The decoding portion 24 thus knows the timing for switching the decoding rules, ending the use of the first decoding rules and starting the use of the second decoding rules.

Between time $t_{13}$ and $t_{16}$, the decoding portion 24 decodes COM 171", DATA 173" and COM 171" included in the multilevel code string 18 according to the second decoding rules (refer to FIG. 9b) referring to the preceding amplitude value latched in the second latching portion 23 to reproduce COM 171, DATA 173 and COM 171.

The decoding portion detects that the amplitude value "Z" of the inputted multilevel code string 18 repeats twice across time $t_{16}$. The decoding portion 24 detects a change from COM 171" to COM 172" according to the second decoding rule 8 and starts reproducing COM 172. This start of reproducing COM 172 causes the decoding portion 24 to start counting as described above. The decoding portion 24 decodes COM 172" composed of four multilevel codes between time $t_{16}$ and $t_{17}$ to continue to reproduce COM 172. When the counter shows "4", the decoding portion 24 stops using the second decoding rules this time and starts using the first decoding rules.

From then on, the decoding portion 24 repeats the above described series of operations, decoding the inputted multilevel code string 18 according to the first or second decoding rule to reproduce symbols.

In the third embodiment described above, the encoding and decoding rules are changed at the appropriate times in the encoding portion 14 and the decoding portion 24. This change is controlled by COM 172. The transmission device can therefore select optimal encoding rules and decoding rules suitable for the surrounding environment during time period $T_1$ or $T_2$. Further, for example, even if the multilevel code string 18 generated with the first encoding rules cannot keep DC balance in relation to the surrounding environment, it is possible to improve DC balance of the multilevel code string 18 by changing the first encoding rules to the second ones.

In the present embodiment, only the encoding rules and the decoding rules are changed. However, the encoding portion 14 can perform encoding with quaternary codes (refer to FIGS. 2a to 2d) as the first encoding rules and further with ternary codes (refer to FIGS. 4a to 4d) as the second decoding rules. In this case, as a matter of course, the decoding portion 24 decodes using the decoding rules shown in FIG. 3 and FIG. 5 as the first and the second decoding rules, respectively. That is, the transmission device can also change the number of amplitude values for use in encoding and decoding. For example, a change from quaternary transmission to ternary transmission improves the SNR (Signal to Noise Ratio) of the multilevel code string 18 to be generated, thereby improving information transmission reliability. A change from ternary transmission to quaternary transmission improves the transmission rate of the multilevel code string 18 to be generated, thereby achieving high-speed information transmission. The transmission device may transmit a plurality of information with different priorities from each other from the transmission end 1 to the receiving end 2. In this case, the transmission device may carry information with high priority (important information) on the multilevel code-string 18 with less amplitude values and information with low priority (not-so-important information) on the multilevel code string 18 with more amplitude values.

Furthermore, the transmission device may change a baud rate.

In the present embodiment, the transmission device switches the encoding rules and the decoding rules based on COM 172. However, the encoding portion 14 and the decoding portion 24 may switch the encoding rules and the decoding rules based on predetermined timing.

Further, a combination of switching of the encoding rules and the decoding rules, switching of the member of amplitude for use in encoding and decoding and switching of the band rate can also apply to the transmission device. In addition, of the three types of switching, a combination of any two types can also be applied to the transmission device.

(Fourth Embodiment)

Figure 10:
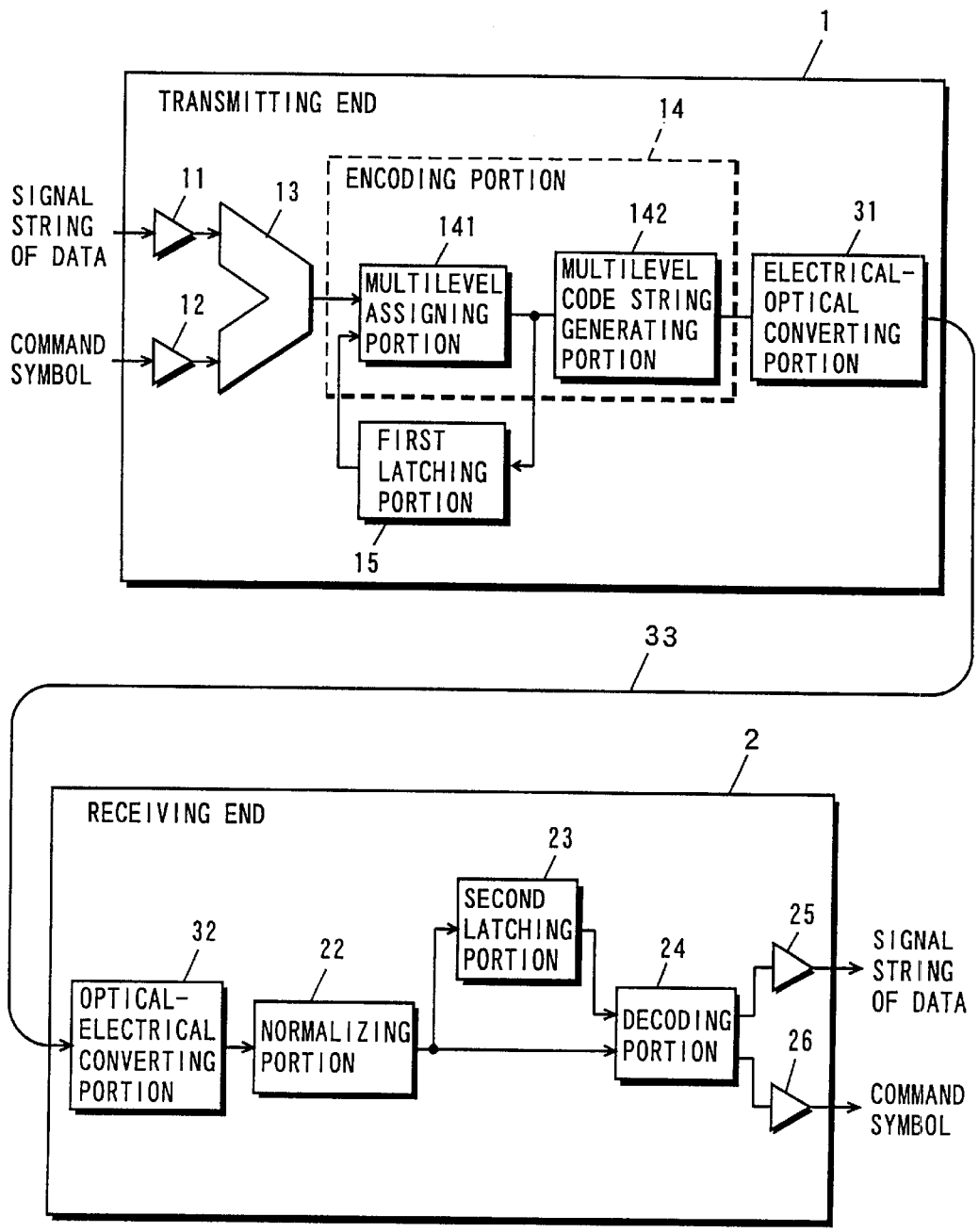
FIG. 10 shows the block structure of a transmission device according to a fourth embodiment.
Figure 11:
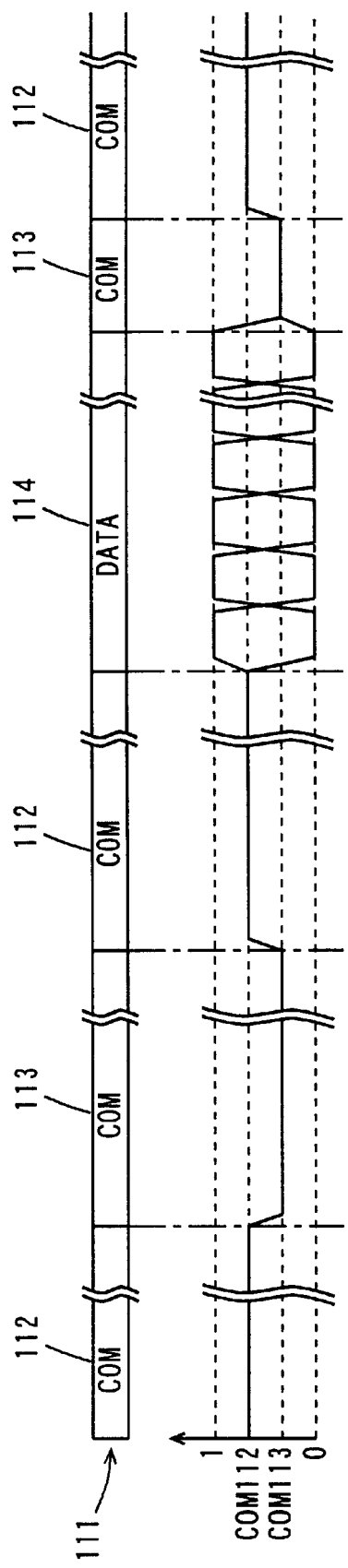
FIG. 11 shows symbol commands and data strings to be encoded by the 4B5B encoding method.
Figure 12:
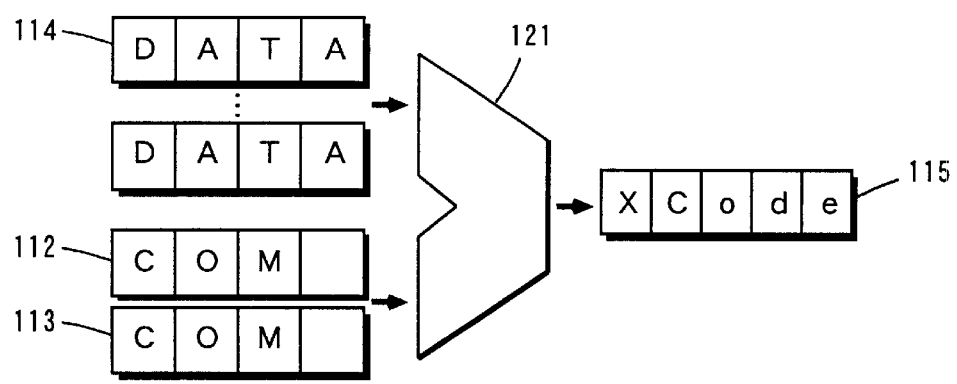
FIG. 12 is a diagram for describing the 4B5B encoding method.
Figure 13A:
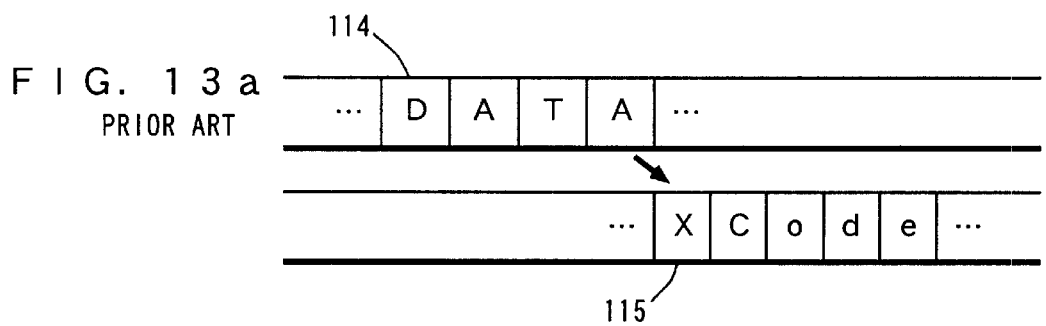
FIG. 13 is a diagram for describing problems in the 4B5B encoding method.
Figure 13B:
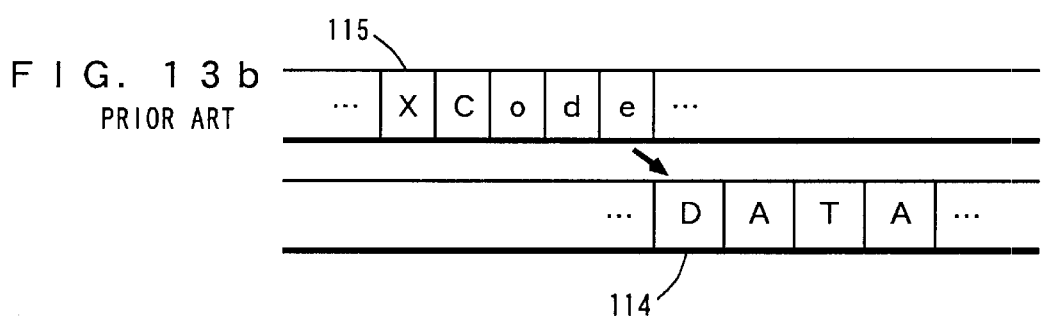

Although electrical transmission has been described in the above first to third embodiments, the present invention can also be applied to optical transmission, as described below in a fourth embodiment. FIG. 10 is a block diagram showing the structure of a transmission device according to the fourth embodiment. The transmission device of FIG. 10 is different as compared with that of FIG. 1 in that the transmitting end 1 includes an electrical/optical converting portion 31 in place of the transmitting portion 16, the receiving end 2 includes an optical/electrical converting portion 32 in place of the receiving portion 21, and the transmission device includes an optical transmission path 33 in place of the transmission path 3. Since the other structures are the same, components of FIG. 10 corresponding to those of FIG. 1 are provided with the same reference numerals and their description is omitted. Furthermore, since any of the above described encoding and decoding rules may be applied to the rules set in the encoding portion 14 and the decoding portion 24, description of the encoding and decoding rules is omitted in the fourth embodiment.

In FIG. 10, the electrical/optical converting portion 31 of the transmitting end 1 receives an input of a multilevel code string generated by the encoding portion 14. The electrical/optical converting portion 31 performs electrical/optical conversion to the inputted multilevel code string to generate an optical signal. The optical signal is outputted to the optical transmission path 33. The optical transmission path 33 conveys the inputted optical signal to the receiving end 2. The optical/electrical converting portion 32 of the receiving end 2 receives an input of the optical signal through the optical transmission path 33. The optical/electrical converting portion 32 performs optical/electrical conversion to the inputted optical signal, reproduces the multilevel code string, and then outputs to the normalizing portion 22. Each step following to the normalizing portion 22 operates in the same manner as described in the above embodiments, and decodes and reproduces the data string and command.

While the invention has been described in detail, the foregoing description is in all aspects illustrative and not restrictive. It is understood that numerous other modifications and variations can be devised without departing from the scope of the invention.

What is claimed is:

1. A method for transmitting multilevel codes represented by a plurality of amplitude values from a transmitting end to a receiving end through a transmission path, said method comprising:

encoding information to be transmitted to the receiving end according to encoding rules defined based on a relation between a previously-generated multilevel code and a currently-generated multilevel code, and generating a multilevel code string at the transmitting end;

transmitting the multilevel code string to the transmission path at the transmitting end;

receiving the multilevel code string through the transmission path at the receiving end; and decoding the multilevel code string according to decoding rules corresponding to the encoding rules based on a relation between a currently-received multilevel code and a previously-received multilevel code, and reproducing the information at the receiving end, wherein the transmitting end encodes a predetermined command as the information into the multilevel code string and changes the encoding rules based on the predetermined command, and the receiving end reproduces the predetermined command and changes the decoding rules based on the predetermined command.

2. A method for transmitting multilevel codes represented by a plurality of amplitude values from a transmitting end to a receiving end through a transmission path, said method comprising:

encoding information to be transmitted to the receiving end according to encoding rules defined based on a relation between a previously-generated multilevel code and a currently-generated multilevel code, and generating a multilevel code string at the transmitting end;

transmitting the multilevel code string to the transmission path at the transmitting end;

receiving the multilevel code string through the transmission path at the receiving end; and decoding the multilevel code string according to decoding rules corresponding to the encoding rules based on a relation between a currently-received multilevel code and a previously-received multilevel code, and reproducing the information at the receiving end, wherein the transmitting end changes a number of the plurality of amplitude values to be used for the multilevel codes as required.

3. A method for transmitting multilevel codes represented by a plurality of amplitude values from a transmitting end to a receiving end through a transmission path, said method comprising:

encoding information to be transmitted to the receiving end according to encoding rules defined based on a relation between a previously-generated multilevel code and a currently-generated multilevel code, and generating a multilevel code string at the transmitting end;

transmitting the multilevel code string to the transmission path at the transmitting end;

receiving the multilevel code string through the transmission path at the receiving end; and decoding the multilevel code string according to decoding rules corresponding to the encoding rules based on a relation between a currently-received multilevel code and a previously-received multilevel code, and reproducing the information at the receiving end, wherein the transmitting end encodes a predetermined command as the information into the multilevel code string and changes the encoding rules and a number of the plurality of amplitude values to be used for the multilevel codes based on the predetermined command, and the receiving end reproduces the predetermined command and changes the decoding rules and the number of the plurality of amplitude values to be used for the multilevel codes based on the predetermined command.

4. A method for optically transmitting multilevel codes represented by a plurality of amplitude values from a transmitting end to a receiving end through an optical transmission path, said method comprising:

encoding information to be transmitted to the receiving end according to encoding rules defined based on a relation between a previously-generated multilevel code and a currently-generated multilevel code, and generating a multilevel code string at the transmitting end;

performing electrical/optical conversion to the multilevel code string, to generate an optical signal at the transmitting end;

transmitting the optical signal to the optical transmission path at the transmitting end;

performing optical/electrical conversion to the optical signal inputted through the optical transmission path, and reproducing the multilevel code string at the receiving end; and decoding the multilevel code string according to decoding rules corresponding to the encoding rules based on a relation between a currently-reproduced multilevel code and a previously-reproduced multilevel code, and reproducing the information at the receiving end, wherein the transmitting end encodes a predetermined command as the information into the multilevel code string and changes the encoding rules based on the predetermined command, and the receiving end reproduces the predetermined command and changes the decoding rules based on the predetermined command.

5. A method for optically transmitting multilevel codes represented by a plurality of amplitude values from a transmitting end to a receiving end through an optical transmission path, said method comprising:

encoding information to be transmitted to the receiving end according to encoding rules defined based on a relation between a previously-generated multilevel code and a currently-generated multilevel code, and generating a multilevel code string at the transmitting end;

performing electrical/optical conversion to the multilevel code string, to generate an optical signal at the transmitting end;

transmitting the optical signal to the optical transmission path at the transmitting end;

performing optical/electrical conversion to the optical signal inputted through the optical transmission path, and reproducing the multilevel code string at the receiving end; and decoding the multilevel code string according to decoding rules corresponding to the encoding rules based on a relation between a currently-reproduced multilevel code and a previously-reproduced multilevel code, and reproducing the information at the receiving end, wherein the transmitting end changes a number of the plurality of amplitude values to be used for the multilevel codes as required.

6. A method for optically transmitting multilevel codes represented by a plurality of amplitude values from a transmitting end to a receiving end through an optical transmission path, said method comprising:

encoding information to be transmitted to the receiving end according to encoding rules defined based on a relation between a previously-generated multilevel code and a currently-generated multilevel code, and generating a multilevel code string at the transmitting end;

performing electrical/optical conversion to the multilevel code string, to generate an optical signal at the transmitting end;

transmitting the optical signal to the optical transmission path at the transmitting end;

performing optical/electrical conversion to the optical signal inputted through the optical transmission path, and reproducing the multilevel code string at the receiving end; and decoding the multilevel code string according to decoding rules corresponding to the encoding rules based on a relation between a currently-reproduced multilevel code and a previously-reproduced multilevel code, and reproducing the information at the receiving end, wherein the transmitting end encodes a predetermined command as the information into the multilevel code string and changes the encoding rules and a number of the plurality of amplitude values to be used for the multilevel codes based on the predetermined command, and the receiving end reproduces the predetermined command and changes the decoding rules and the number of the plurality of amplitude values to be used for the multilevel codes based on the predetermined command.

7. A device for transmitting multilevel codes represented by a plurality of amplitude values from a transmitting end to a receiving end through a transmission path, said transmitting end comprising:

an encoding portion operable to encode information to be transmitted to said receiving end according to encoding rules defined based on a relation between a previously-generated multilevel code and a currently-generated multilevel code, and generate a multilevel code string; and a transmitting portion operable to transmit the multilevel code string to the transmission path, and said receiving end comprising:

a receiving portion operable to receive the multilevel code string through the transmission path; and a decoding portion operable to decode the multilevel code string received by said receiving portion according to decoding rules corresponding to the encoding rules based on a relation between a multilevel code currently received by said receiving portion and a multilevel code previously received by said receiving portion, and reproduce the information, wherein said encoding portion encodes a predetermined command as the information into the multilevel code string and changes the encoding rules based on the predetermined command, and said decoding portion reproduces the predetermined command and changes the decoding rules based on the predetermined command.

8. A device for transmitting multilevel codes represented by a plurality of amplitude values from a transmitting end to a receiving end through a transmission path, said transmitting end comprising:
an encoding portion operable to encode information to be transmitted to said receiving end according to encoding rules defined based on a relation between a previously-generated multilevel code and a currently-generated multilevel code, and generate a multilevel code string; and
a transmitting portion operable to transmit the multilevel code string to the transmission path, and said receiving end comprising:
a receiving portion operable to receive the multilevel code string through the transmission path, and
a decoding portion operable to decode the multilevel code string received by said receiving portion according to decoding rules corresponding to the encoding rules based on a relation between a multilevel code currently received by said receiving portion and a multilevel code previously received by said receiving portion, and reproduce the information, wherein
said encoding portion and said decoding portion change a number of the plurality of amplitude values to be used for the multilevel codes as required.

9. A device for transmitting multilevel codes represented by a plurality of amplitude values from a transmitting end to a receiving end through a transmission path,
said transmitting end comprising:
an encoding portion operable to encode information to be transmitted to said receiving end according to encoding rules defined based on a relation between a previously-generated multilevel code and a currently-generated multilevel code, and generate a multilevel code string; and
a transmitting portion operable to transmit the multilevel code string to the transmission path, and
said receiving end comprising:
a receiving portion operable to receive the multilevel code string through the transmission path; and
a decoding portion operable to decode the multilevel code string received by said receiving portion according to decoding rules corresponding to the encoding rules based on a relation between a multilevel code currently received by said receiving portion and a multilevel code previously received by said receiving portion, and reproduce the information, wherein
said encoding portion encodes a predetermined command as the information into the multilevel code string and changes the encoding rules and a number of the plurality of amplitude values to be used for the multilevel codes based on the predetermined command, and
said decoding portion reproduces the predetermined command and changes the decoding rules and the number of the plurality of amplitude values to be used for the multilevel codes based on the predetermined command.

10. A device for optically transmitting multilevel codes represented by a plurality of amplitude values from a transmitting end to a receiving end through an optical transmission path,
said transmitting end comprising:
an encoding portion operable to encode information to be transmitted to said receiving end according to encoding rules defined based on a relation between a previously-generated multilevel code and a currently-generated multilevel code, and generate a multilevel code string; and
an electrical/optical converting portion operable to perform electrical/optical conversion to the multilevel code string generated by said encoding portion to generate an optical signal, and transmit the optical signal to the optical transmission path, and
said receiving end comprising:
an optical/electrical converting portion operable to receive the optical signal through the optical transmission path, perform optical/electrical conversion to the optical signal, and reproduce the multilevel code string; and
a decoding portion operable to decode the multilevel code string reproduced by said optical/electrical converting portion according to decoding rules corresponding to the encoding rules based on a relation between a multilevel code currently-reproduced by said optical/electrical converting portion and a multilevel code previously reproduced by said optical/electrical converting portion, and reproduce the information, wherein
said encoding portion encodes a predetermined command as the information into the multilevel code string and changes the encoding rules based on the predetermined command, and
said decoding portion reproduces the predetermined command and changes the decoding rules based on the predetermined command.

11. A device for optically transmitting multilevel codes represented by a plurality of amplitude values from a transmitting end to a receiving end through an optical transmission path,
said transmitting end comprising:
an encoding portion operable to encode information to be transmitted to said receiving end according to encoding rules defined based on a relation between a previously-generated multilevel code and a currently-generated multilevel code, and generate a multilevel code string; and
an electrical/optical converting portion operable to perform electrical/optical conversion to the multilevel code string generated by said encoding portion to generate an optical signal, and transmit the optical signal to the optical transmission path, and
said receiving end comprising:
an optical/electrical converting portion operable to receive the optical signal through the optical transmission path, perform optical/electrical conversion to the optical signal, and reproduce the multilevel code string; and
a decoding portion operable to decode the multilevel code string reproduced by said optical/electrical converting portion according to decoding rules corresponding to the encoding rules based on a relation between a multilevel code currently-reproduced by said optical/electrical converting portion and a multilevel code previously reproduced by said optical/electrical converting portion, and reproduce the information, wherein
said encoding portion and said decoding portion change a number of the plurality of amplitude values to be used for the multilevel codes as required.

12. A device for optically transmitting multilevel codes represented by a plurality of amplitude values from a transmitting end to a receiving end through an optical transmission path, said transmitting end comprising:
- an encoding portion operable to encode information to be transmitted to said receiving end according to encoding rules defined based on a relation between a previously-generated multilevel code and a currently-generated multilevel code, and generate a multilevel code string; and
- an electrical/optical converting portion operable to perform electrical/optical conversion to the multilevel code string generated by said encoding portion to generate an optical signal, and transmit the optical signal to the optical transmission path, and said receiving end comprising:
- an optical/electrical converting portion operable to receive the optical signal through the optical transmission path, perform optical/electrical conversion to the optical signal, and reproduce the multilevel code string; and
- a decoding portion operable to decode the multilevel code string reproduced by said optical/electrical converting portion according to decoding rules corresponding to the encoding rules based on a relation between a multilevel code currently-reproduced by said optical/electrical converting portion and a multilevel code previously reproduced by said optical/electrical converting portion, and reproduce the information, wherein said encoding portion encodes a predetermined command as the information into the multilevel code string and changes the encoding rules and a number of the plurality of amplitude values to be used for the multilevel codes based on the predetermined command, and said decoding portion reproduces the predetermined command and changes the decoding rules and the number of the plurality of amplitude values to be used for the multilevel codes based on the predetermined command.

* * * * *